United States Patent
Kezobo et al.

(10) Patent No.: US 7,990,093 B2
(45) Date of Patent: Aug. 2, 2011

(54) ELECTRIC MOTOR CONTROL APPARATUS

(75) Inventors: Isao Kezobo, Tokyo (JP); Masahiro Kimata, Tokyo (JP); Takayuki Kifuku, Tokyo (JP); Kazumichi Tsutsumi, Tokyo (JP); Chiaki Fujimoto, Tokyo (JP); Noriyuki Inoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 585 days.

(21) Appl. No.: 12/279,859

(22) PCT Filed: Apr. 20, 2006

(86) PCT No.: PCT/JP2006/308323
§ 371 (c)(1),
(2), (4) Date: Aug. 19, 2008

(87) PCT Pub. No.: WO2007/129359
PCT Pub. Date: Nov. 15, 2007

(65) Prior Publication Data
US 2009/0021207 A1    Jan. 22, 2009

(51) Int. Cl.
*H02P 7/00* (2006.01)

(52) U.S. Cl. ........ 318/432; 318/433; 318/434; 318/802; 318/803; 361/63; 361/65; 361/93.1; 324/509; 324/510; 324/511

(58) Field of Classification Search .......... 318/432–434, 318/802, 803; 361/42, 63, 65, 93.1; 324/509–511
See application file for complete search history.

(56) References Cited

U.S. PATENT DOCUMENTS

| 6,593,714 | B2 * | 7/2003 | Nagayama | 318/400.07 |
| 7,042,181 | B2 | 5/2006 | Nagakura | |
| 7,450,355 | B2 * | 11/2008 | Ochiai | 361/31 |
| 7,459,879 | B2 * | 12/2008 | Kezobo et al. | 318/803 |
| 7,759,888 | B2 * | 7/2010 | Matsui et al. | 318/400.29 |
| 2005/0241875 | A1 | 11/2005 | Ta et al. | |
| 2011/0018578 | A1 * | 1/2011 | Bae et al. | 324/764.01 |

FOREIGN PATENT DOCUMENTS

| JP | 11-220884 A | 8/1999 |
| JP | 2003-081099 A | 3/2003 |
| JP | 2003-259654 A | 9/2003 |
| JP | 2004-120883 A | 4/2004 |
| JP | 2005-051901 A | 2/2005 |
| JP | 2005-073381 A | 3/2005 |
| JP | 2005-153570 A | 6/2005 |
| JP | 2005-218215 A | 8/2005 |
| JP | 2005-313807 A | 11/2005 |

* cited by examiner

*Primary Examiner* — Bentsu Ro
*Assistant Examiner* — Erick Glass
(74) *Attorney, Agent, or Firm* — Leydig, Voit & Mayer, Ltd.

(57) ABSTRACT

A control apparatus for a multiphase AC electric motor having an inverter includes a current control including an abnormal-state current controller; an abnormal-state detector that detects an abnormal state of any of a wire of an electric motor, a wire of an inverter, and a wire connecting the electric motor to the inverter as an abnormal phase; and an abnormal phase disconnect. The abnormal phase disconnect disconnects one or more of phases detected to be in an abnormal-state and the abnormal-state current controller generates an abnormal state voltage command in accordance with detection of an abnormal state, and uses phases other than the disconnected phases of the inverter to control individual currents of the phases, with the abnormal-state voltage command used as a multiphase voltage command.

20 Claims, 18 Drawing Sheets

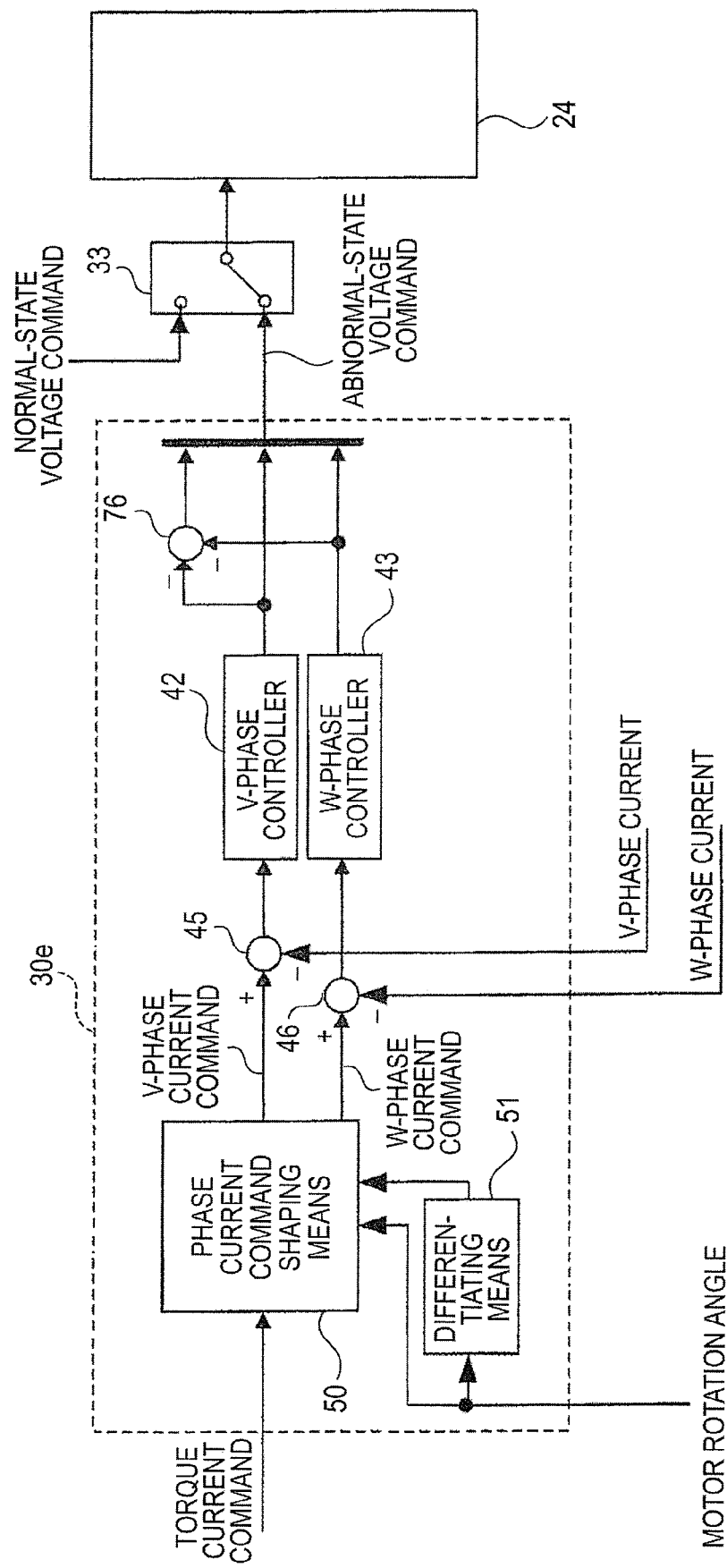

ELECTRIC MOTOR CONTROL APPARATUS

TECHNICAL FIELD

This invention relates to an electric motor control apparatus which drives an electric motor, and more particularly to a control apparatus for an electric motor, in which even when any abnormality such as grounding or short-circuiting has occurred in one phase or between the two phases of the multiphase electric motor or an inverter, the electric motor can be driven by a control scheme suited to the abnormal state.

BACKGROUND ART

An example of a prior-art apparatus is, for example, an apparatus which is disclosed in Patent Document 1 indicated below.

The apparatus stated in Patent Document 1 includes fuses in the respective phases of an inverter, and in an abnormal state where any switching element short-circuits, the apparatus prevents a brake torque ascribable to induced power in such a way that a current which is larger than in an abnormal state is caused to flow through a short-circuiting path, thereby to blow out the fuse and to open a closed circuit passing through the short-circuiting place.

Besides, an example of another prior-art apparatus is an apparatus which is disclosed in Patent Document 2 indicated below.

The apparatus stated in Patent Document 2 is such that, in an abnormal state where two phases short-circuit therebetween among the wires of three phases as connect a three-phase electric motor and switching elements, motor relays disposed in the wires are held closed without being opened, thereby to continue controllable states. Besides, any overcurrent is suppressed by limiting duties so that the upper switching elements and lower switching elements of the two phases having short-circuited may not fall into their ON states at the same time.

Patent Document 1: JP-A-2003-81099
Patent Document 2: JP-A-2005-153570

DISCLOSURE OF THE INVENTION

Problems that the Invention is to Solve

Heretofore, as an apparatus which continues a control in the abnormal state of an electric motor or an inverter, there has been a control scheme in an abnormal state where one phase falls into an open state, or in an abnormal state where two phases short-circuit therebetween.

However, there has not been an apparatus concerning a control scheme in which, in case of the occurrence of any other abnormal state, for example, the grounding of one phase, the short-circuiting of the winding of one phase, or the short-circuiting of a switching element, a torque output is continued without using a hardware device that is used in only the abnormal state.

In the example as stated in Patent Document 1, the fuse is blown out in the abnormal state where the switching element short-circuits. Since, however, the hardware of the fuses needs to be added, the size and cost of the inverter enlarge. Besides, although the brake torque ascribable to the induced power can be prevented, a control is not continued.

In the example as stated in Patent Document 2, in the abnormal state where the two phases short-circuit therebetween, the motor relays are held closed, thereby to limit the duties of the abnormal phases. However, the apparatus merely continues the controllable state while suppressing the overcurrent, and it is not intended to suppress a torque pulsation ascribable to the abnormal state and to improve the operation of the motor, by contriving a current control method. Accordingly, the apparatus has the problem that the torque pulsation of the motor attributed to the abnormal state is large.

Besides, the prevention of the overcurrent in Patent Document 2 is based on the limitation of the duties, and the switching elements are driven in conformity with the duties which are really limited. Therefore, the apparatus has the problem that a short-circuiting path is formed due to the errors of the response delays of a plurality of switching elements or the error of the timing of the driving circuit of the switching elements, so an overcurrent is apprehended to appear.

This invention has been made in view of the problems of the prior-art apparatuses as mentioned above, and it has for its object to provide a control apparatus for an electric motor, in which any overcurrent is prevented in a case where the abnormal state of the electric motor or an inverter has occurred, for example, where the grounding of one phase, the short-circuiting of the winding of one phase, the short-circuiting of any switching element, the short-circuiting between two phases, or the like has occurred, and in which a current control method is altered to a control scheme suited to the abnormal state, whereby a torque pulsation ascribable to the abnormal state is suppressed, and the operation of the motor can be improved.

Means for Solving the Problems

An electric motor control apparatus according to this invention consists in an electric motor control apparatus for a multiphase AC electric motor, configured comprising a current detecting circuit which detects currents flowing through respective phases of the electric motor, a current control means for determining a multiphase voltage command in accordance with a torque current command corresponding to a target value of a torque to be generated by the electric motor and detection currents of the respective phases from the current detecting circuit, a switching element driving circuit which commands an inverter to perform switching manipulations on the basis of the multiphase voltage command from the current control means, and the inverter which consists of switching elements that are operated by receiving switching manipulation signals from the switching element driving circuit and that control currents to be fed to the respective phases of the electric motor; wherein the current control means further includes a normal-state current controlling means for use in an normal state, an abnormal-state current controlling means for use in an abnormal state, an abnormal-state determining means for determining the abnormal state of a wire of the electric motor, a wire of the inverter, or a wire connecting the electric motor and the inverter, and an abnormal phase disconnecting means; and wherein the abnormal phase disconnecting means disconnects at least one of abnormal phases determined by the abnormal-state determining means, from the circuit, and the abnormal-state current controlling means generates an abnormal-state voltage command corresponding to the abnormal state determined by the abnormal-state determining means, and uses phases other than the disconnected phase of the inverter so as to perform current controls of the phases with the abnormal-state voltage command used as the multiphase voltage command.

Besides, the electric motor control apparatus of this invention is so configured that an abnormal-state voltage command corresponding to the abnormal state determined by the abnormal-state determining means is generated by the abnormal-state current controlling means, and that both the abnormal phase and normal phases of the inverter are used to perform current controls of the phases with the abnormal-state voltage command used as the multiphase voltage command, without disconnecting the abnormal phase.

Advantages of the Invention

In accordance with the electric motor control apparatus of this invention, even in a case where an abnormal state such as grounding or short-circuiting has occurred in the wire of an electric motor, the wire of an inverter, or a wire connecting the electric motor and the inverter, at least one of phases having undergone the abnormal states is disconnected, thereby to prevent any overcurrent from flowing due to the abnormal state, and a control suited to the abnormal state can be continued using the left phases of the inverter, to bring forth the advantage that the torque output of the electric motor is continued and that a torque pulsation ascribable to the abnormal state is suppressed, so the operation of the motor can be improved.

Besides, in accordance with the electric motor control apparatus of this invention, in a case where a short-circuiting abnormal state has occurred in one phase of the wire of an electric motor, the wire of an inverter, or a wire connecting the electric motor and the inverter, a voltage command suited to the abnormal state is generated using both the abnormal phase and normal phases of the inverter, whereby the torque output of the electric motor is continued, and a torque pulsation ascribable to the abnormal state is suppressed, so that the operation of the motor can be improved.

Furthermore, in accordance with the electric motor control apparatus of this invention, it is possible to obtain a control apparatus for an electric motor as is suitable as a control apparatus for a three-phase brushless motor which is used for driving an electrically-driven power steering apparatus.

BRIEF DESCRIPTION OF THE DRAWINGS

FIG. 16 is a control block-line diagram of an abnormal-state current controlling means in Embodiment 5 of the invention.

BEST MODE FOR CARRYING OUT THE INVENTION

Embodiment 1

Embodiment 1 of this invention will be described in conjunction with the drawings.

Incidentally, although a case where this invention is applied to a three-phase brushless motor will be exemplified in the ensuing description, this invention is not limited thereto, but it can be used for an electric motor which is driven to rotate by a multiphase alternating current.

Figure 1:
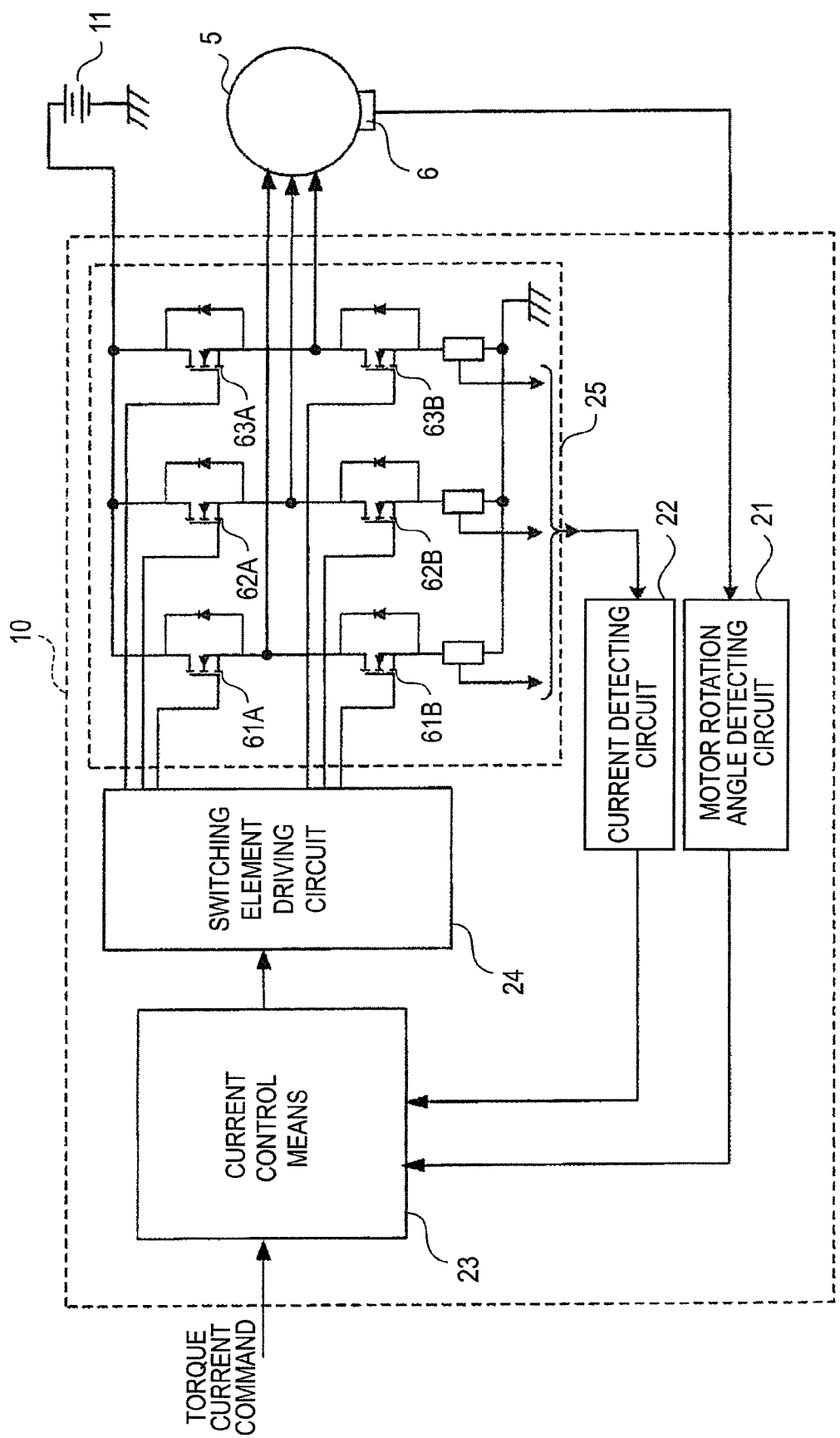
FIG. 1 is a schematic block diagram showing the whole configuration of an electric motor control apparatus according to Embodiment 1 of the present invention.

FIG. 1 is a schematic block diagram showing the whole configuration of an electric motor control apparatus according to Embodiment 1 of this invention.

Referring to FIG. 1, numeral 10 designates the electric motor control apparatus, and the brushless motor (hereinbelow, also termed "motor") 5 which includes the windings of the three phases of U-, V- and W-phases is controlled by employing this electric motor control apparatus 10.

The electric motor control apparatus 10 receives a signal from a motor angle sensor 6 which detects the rotation angle of the motor 5, and it calculates the rotation angle of the motor by a motor rotation angle detecting circuit 21. Besides, the electric motor control apparatus calculates currents flowing through the respective phases of the motor 5, by a current detecting circuit 22.

As will be stated later, a current control means 23 determines a three-phase voltage command in accordance with a torque current command corresponding to the target value of a motor torque, the detection currents of the respective motor phases, and the motor rotation angle. A switching element driving circuit 24 subjects the three-phase voltage command determined by the current control means 23, to PWM modulation, and thus commands an inverter 25 to perform switching manipulations.

The inverter 25 receives switching manipulation signals from the switching element driving circuit 24, thereby to realize the chopper controls of switching elements 61A-63A and 61B-63B constituting output arms, and it causes currents to flow through the respective phases of the motor 5, by electric power fed from a battery 11. The motor torque is generated by the currents flowing through the respective phases.

Next, the current control means 23 will be described with reference to a block diagram of FIG. 2.

Figure 2:
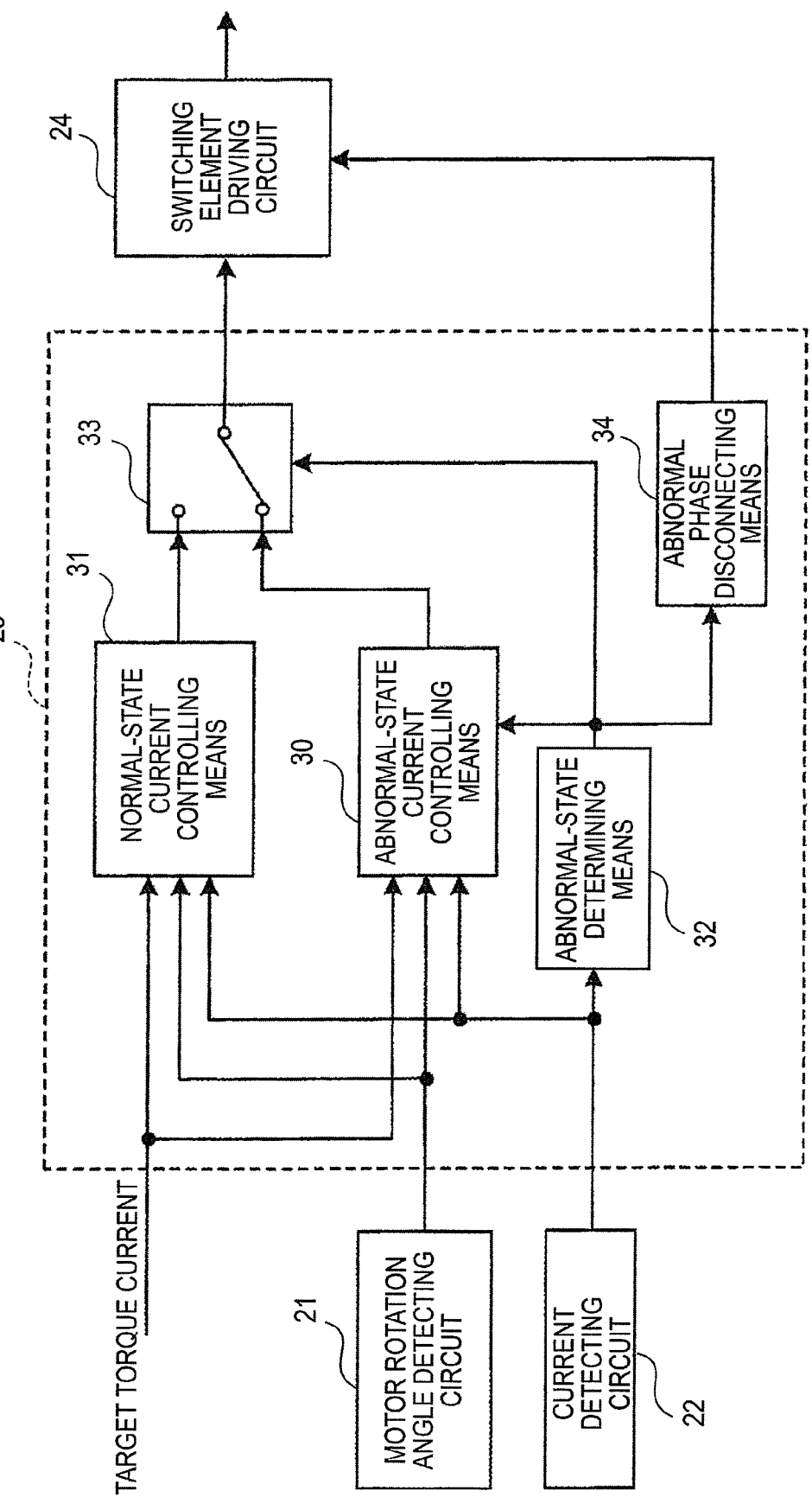
FIG. 2 is a block diagram showing the configuration of a current control means in Embodiment 1 of the invention.

As shown in FIG. 2, the current control means 23 includes a normal-state current controlling means 31 for executing an ordinary control scheme for use in a normal state, an abnormal-state current controlling means 30 for use in an abnormal state, an abnormal-state determining means 32, a switching means 33, and an abnormal phase disconnecting means 34, and it is permitted to switch the two current controlling means 30 and 31.

The abnormal-state determining means 32 performs the following determination on the basis of the three-phase detection currents fed from the current detecting circuit 22. That is, when the length of a time, for which the magnitude of the detection current of any phase remains above a preset value and for which the detection currents of the other phases remain at or below the preset value, has reached a preset value, the abnormal-state determining means 32 determines that the phase is in an abnormal state. With such an abnormal-state determining means, abnormal states are not determined independently of the respective phases, but they are determined relatively or comprehensively on the basis of the detection currents of the three phases, so that the apprehension of an erroneous determination can be relieved.

Besides, the abnormal-state determining means 32 feeds an abnormal-state determination signal to the abnormal-state current controlling means 30, the switching means 33 and the abnormal phase disconnecting means 34 in order to notify the presence or absence of any abnormal state and the abnormal phase.

The abnormal-state current controlling means 30 receives the abnormal-state determination signal from the abnormal-state determining means 32, and it stops its function in a normal state, whereas it performs a control coping with any abnormal phase in a case where the abnormal state has been detected from the certain phase.

The switching means 33 receives the abnormal-state determination signal from the abnormal-state determining means 32, and it outputs a three-phase normal-state voltage command from the normal-state current controlling means 31 as the three-phase voltage command in a case where the signal of the normal state has been detected, whereas it outputs a three-phase abnormal-state voltage command from the abnormal-state current controlling means 30 as the three-phase voltage command in a case where the signal of the abnormal state has been detected.

The abnormal phase disconnecting means 34 receives the abnormal-state determination signal from the abnormal-state determining means 32, and it sends a command for stopping the drive of the switching element of the abnormal phase, to the switching element driving circuit 24 in order to disconnect the abnormal phase for the purpose of preventing any overcurrent.

Incidentally, the normal-state current controlling means 31 may be configured of a known device as shown in, for example, FIG. 17 of International Publication WO 2005/091488, and it performs an ordinary dq control in the normal state, thereby to realize the generation of a smooth motor torque. Since it is not directly pertinent to the purport of this invention, it shall be omitted from detailed description.

Next, there will be described a case where an abnormal state has occurred in one phase of the motor or the inverter, for example, a case where an abnormal state in which the V-phase of motor wiring, the V-phase of inverter wiring, or the V-phase of wiring connecting the motor and the inverter short-circuits to a wire leading to the minus potential of the battery, or an abnormal state in which the lower switching element of one phase, for example, the V-phase of the output arms of the inverter short-circuits, that is, the grounding of one phase has developed.

In the case where such an abnormal state has developed, the abnormal-state determining means 32 feeds the abnormal-state determination signal signifying "that the V-phase is abnormal", to the abnormal-state current controlling means 30, the switching means 33 and the abnormal phase disconnecting phase 34 in FIG. 2. In order to prevent any overcurrent from appearing in the V-phase which has undergone the abnormal state, the abnormal phase disconnecting means 34 sends the switching element driving circuit 24 a command for stopping the drives of the switching elements 62A and 62B of the V-phase. Owing to the switching element driving circuit 24 which has received this command, the V-phase switching elements 62A and 62B continue their disabled states, and a drive stop state is established therefor.

Besides, owing to the abnormal-state determination signal, the abnormal-state current controlling means 30 is actuated, and the three-phase abnormal-state voltage command is fed to the switching element driving circuit 24 as the three-phase voltage command through the switching means 33. The abnormal-state current controlling means 30 executes a control scheme shown in FIG. 3, in order to perform a current control in which the phase having undergone the abnormal state is considered.

Figure 3:
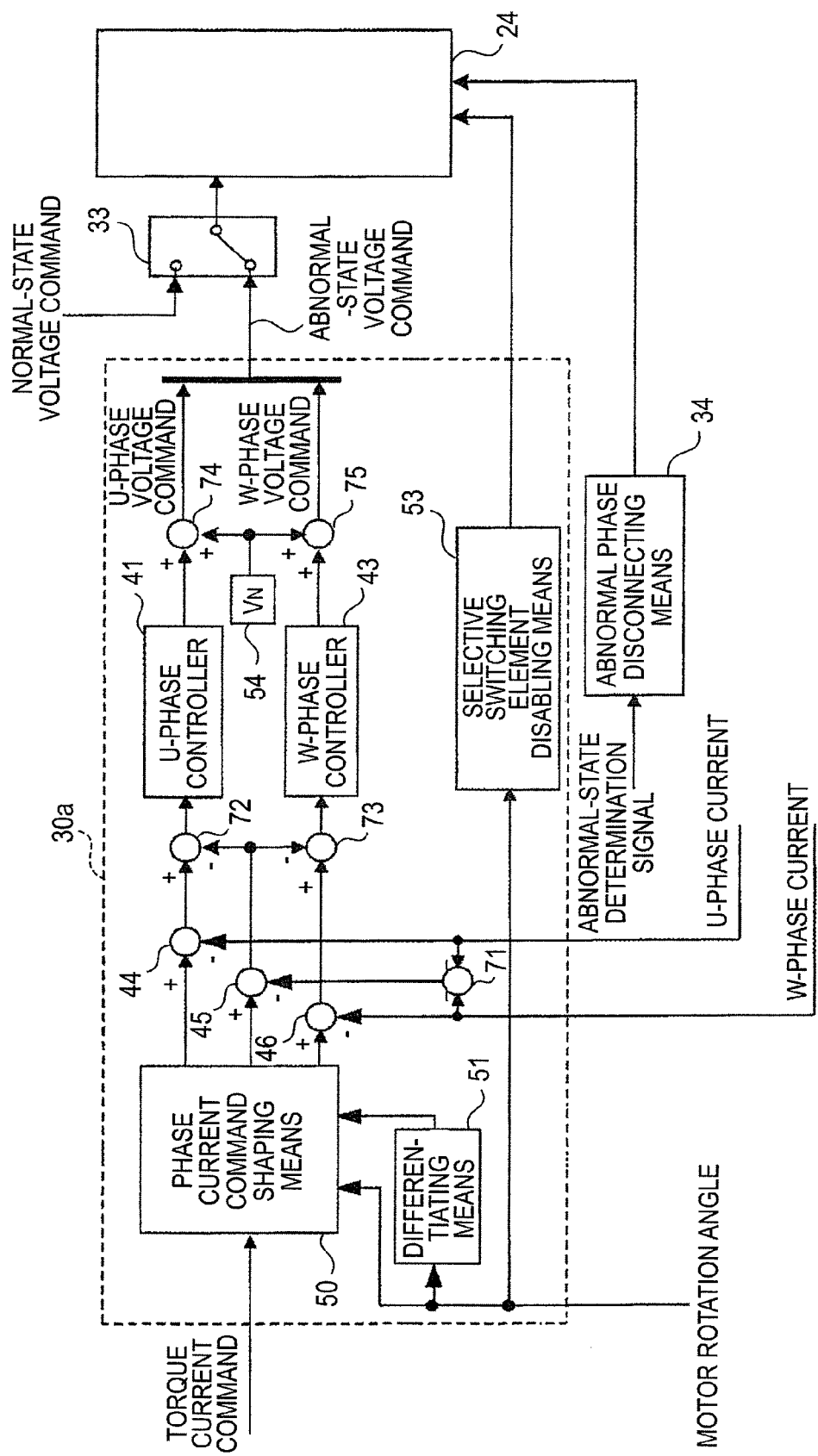
FIG. 3 is a control block-line diagram of an abnormal-state current controlling means in Embodiment 1 of the invention.

Now, the control operation of the abnormal-state current controlling means 30 will be described with reference to FIGS. 3 and 4. FIG. 3 is a control block-line diagram of the abnormal-state current controlling means 30a in the foregoing case where the V-phase has grounded, and this control scheme shall be called the "grounding-state three-phase individual control" below.

Referring to FIG. 3, a phase current command shaping means 50 generates the phase current commands of the respective phases in accordance with the torque current command, the motor rotation angle, and a motor rotation angular velocity obtained by approximately differentiating the motor rotation angle by a differentiating means 51. Subtractors 44, 45 and 46 calculate the current deviations of the corresponding phases, respectively, in such a way that the U-, V- and W-phase detection currents obtained by the current detection circuit 22 are subtracted from U-, V- and W-phase current commands. Subsequently, in order to carry out the current controls of the respective phases with reference to the phase having grounded, subtractors 72 and 73 subtract the current deviation of the V-phase having undergone the abnormal state, from the current deviations of the normal U- and W-phases, and they feed the resulting differences to a U-phase controller 41 and a W-phase controller 43 which are formed of PI controls or the likes.

In order to offset the voltage commands of the normal phases to the voltage of the phase having grounded into the battery minus voltage and to make them appropriate commands, adders 74 and 75 add the battery minus voltage value VN of a minus voltage circuit 54 to U- and W-phase commands outputted from the U-phase controller 41 and the W-phase controller 43, thereby to generate the U- and W-phase voltage commands. The "battery minus voltage value" termed here is a value obtained by bringing the value of ½ of a battery voltage VB into a minus value, that is, VN=−VB/2 holds.

In this way, the abnormal-state controlling means 30a shown in FIG. 3 controls the normal phases individually in accordance with the grounding which has developed in the V-phase.

Figure 4:
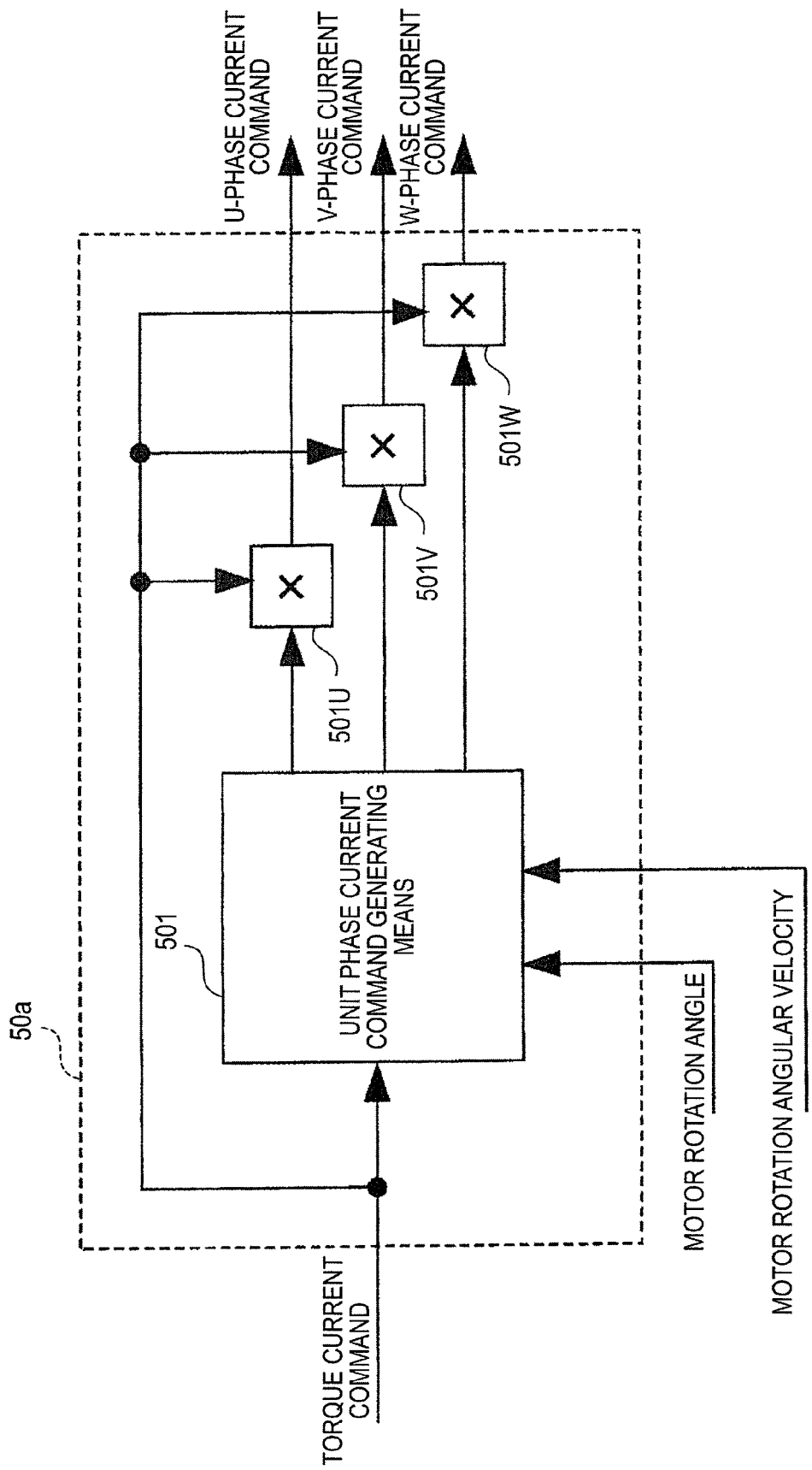
FIG. 4 is a block diagram showing an example of the configuration of a phase current command shaping means in Embodiment 1 of the invention.

The phase current command shaping means 50 has a configuration as shown in FIG. 4 by way of example.

A unit phase current command generating means 501 determines the unit phase current commands of the respective phases in accordance with the torque current command, the motor rotation angle and the motor rotation angular velocity.

Multiplication means 502U, 502V and 502W multiply the torque current command and the unit phase current commands of the corresponding phases, respectively, thereby to calculate the phase current commands of the respective phases. The unit phase current commands signify the phase current commands of the respective phases at the time when the magnitude of the torque current command is "1".

In the unit phase current command generating means 501, the relations of the unit phase current commands to the torque current command, the motor rotation angle and the motor rotation angular velocity are, for example, relations shown in FIG. 5.

Figure 5A:
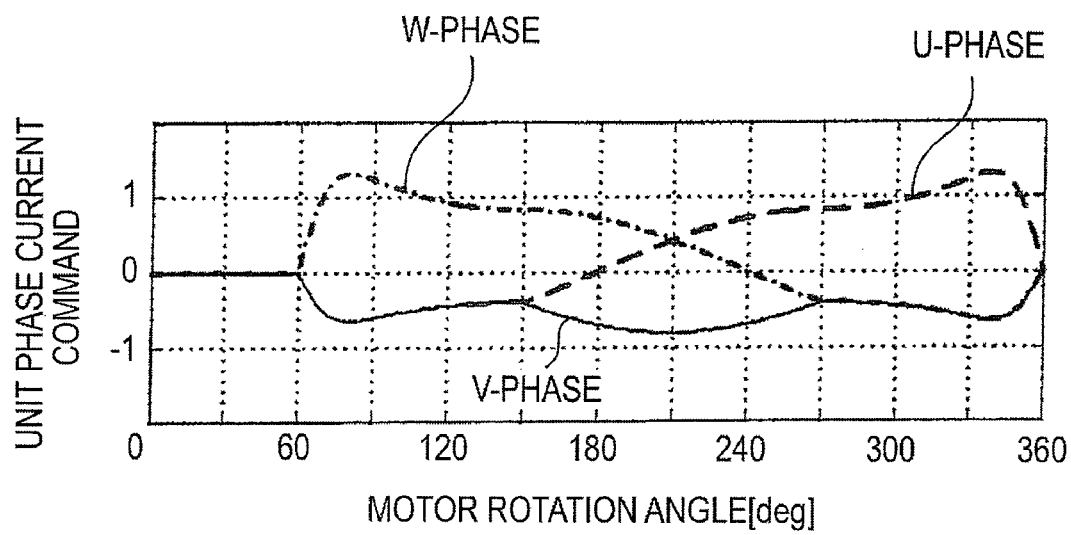
FIG. 5 is a diagram showing examples of untarget phase currents and a motor torque waveform in Embodiment 1 of the invention.
Figure 5B:
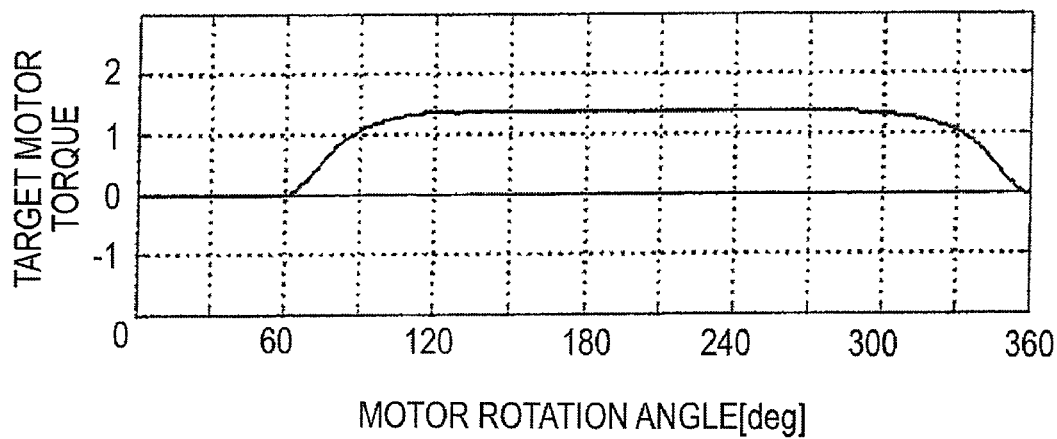

When the unit phase current commands are generated by employing the relations of FIG. 5(a) and such phase current commands can be realized as the currents of the respective phase windings, a motor torque waveform as shown in FIG. 5(b) can be obtained. This is a command which is intended to output a torque of plus direction being as flat as possible, in the abnormal state where one phase grounds as stated before. The motor rotation angle on the axis of abscissas is on the scale of the electrical angle of the motor.

Incidentally, the motor rotation angular velocity is not used in the calculation of the unit target phase currents, and an example which uses the motor rotation angular velocity will be described in Embodiment 6 later.

Besides, the abnormal-state current controlling means 30a is provided with the selective switching element disabling means 53, and the switching element driving circuit 24 can be commanded to temporarily disable the switching elements of the normal phases, in accordance with the motor rotation angle.

By way of example, in the case of employing the unit phase current commands shown in FIG. 5(a), the U-phase switching elements 61A and 61B and the W-phase switching elements 63A and 63B are disabled at the motor rotation angle (0-60°) at which currents are to be zeroized, whereby the number of current paths can be decreased.

Incidentally, FIG. 3 shows the control block-line diagram of the grounding-state three-phase individual control in the case where the abnormal state has occurred in the V-phase, but even in cases where abnormal states have developed in the U- and W-phases, similar grounding-state three-phase individual controls are included in the abnormal-state current controlling means 30a, and they can be switched depending upon the phases in which the abnormal states have occurred.

Here, in order to indicate the advantages of this invention, problems in the abnormal state where one phase grounds as stated before will be stated below.

Figure 6A:
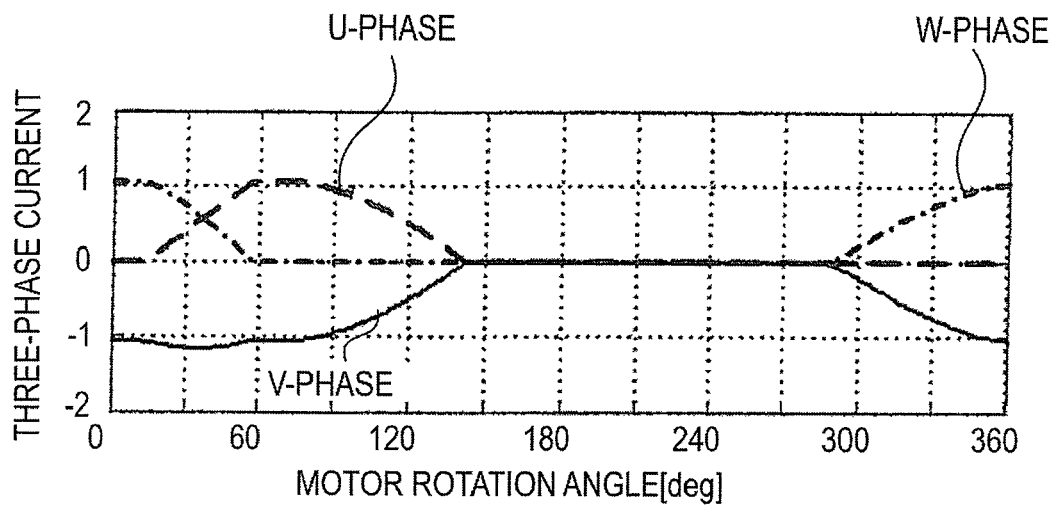
FIG. 6 is a diagram showing examples of current waveforms and a brake torque in the abnormal state where one phase grounds in the electric motor control apparatus.
Figure 6B:
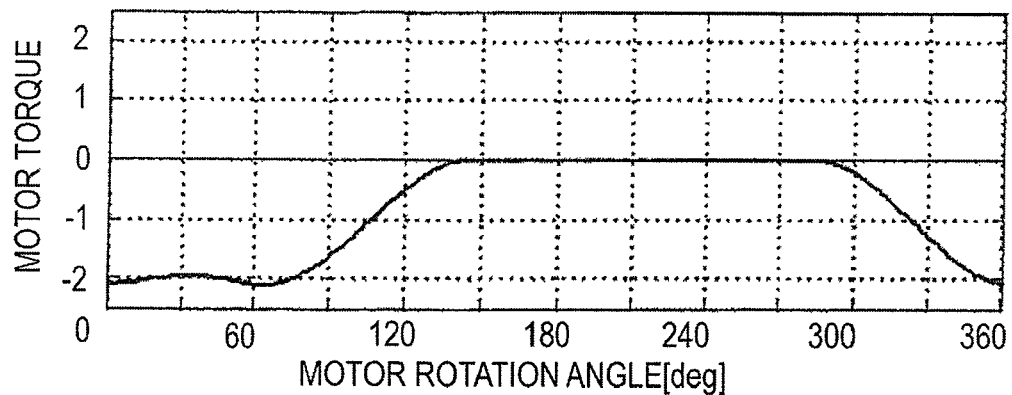

In the abnormal state where one phase grounds as stated before, a closed circuit passing through a grounding place is formed, and hence, a motor rotation angle at which the appearance of a brake torque ascribable to the induced power of the motor is inevitable is existent. The brake torque is a torque which acts in the direction of hampering the rotation of the motor. Even in a case where all the switching elements are disabled, the closed circuit is maintained through the diodes of the normal phases, so that currents based on the induced power flow as shown in FIG. 6, and the brake torque appears.

Incidentally, the diodes are usually included in parallel with the respective switching elements within the inverter 25 as shown in FIG. 1.

Referring to FIG. 5, the unit phase current commands and the motor torque waveform are zeroized at the motor rotation angle (0-60°). The motor rotation angle is a region in which the appearance of the brake torque cannot be prevented, and it is intended to make the currents small even slightly and to make the brake torque small.

Originally, in order to output the plus torque, the voltage of the V-phase ought to be made the highest in the angular region. However, now that the voltage is the lowest value, namely, the minus voltage of the battery on account of the grounding of the V-phase, the generation of the plus torque is impossible. Further, since the closed circuit passing through the grounding place is existent, the brake torque appears, and it is difficult to prevent this brake torque.

Figure 7:
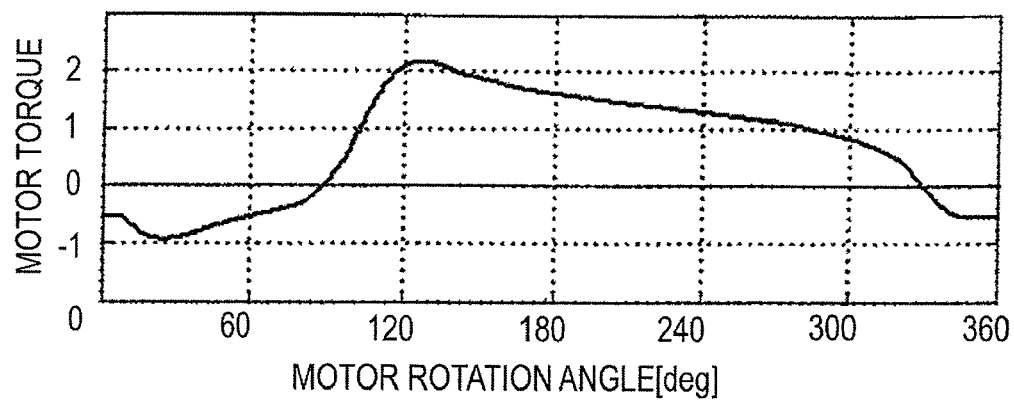
FIG. 7 is a diagram of a motor torque waveform in the abnormal state where one phase grounds in case of employing a control in the prior art.

Besides, when the control is performed by employing the control scheme which is used in the normal state, for example, the dq control, in the abnormal state where one phase grounds as stated before, it is not suited to the abnormal state. As shown in FIG. 7, therefore, there are the problems that the part of a minus value, namely, the brake torque is large, and that also a torque pulsation becomes large.

Figure 8:
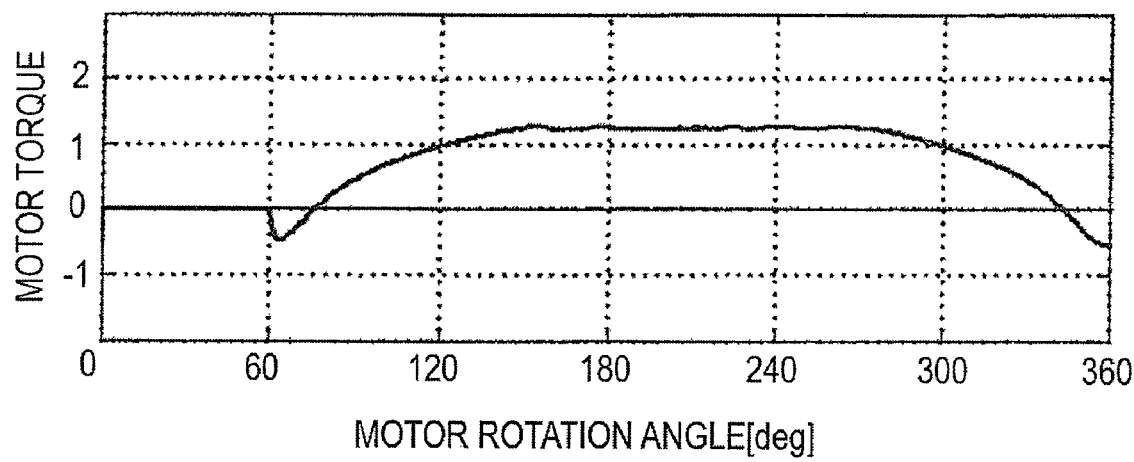
FIG. 8 is a diagram of a motor torque waveform in the abnormal state where one phase grounds in case of employing the electric motor control apparatus according to Embodiment 1 of the invention.

In contrast, when the grounding-state three-phase individual control in Embodiment 1 of this invention is used, the current commands of the respective phases suitable for the abnormal state are generated by the phase current command shaping means 50, and the control is configured so as to realize the current commands. As in a motor torque waveform shown in FIG. 8, therefore, the appearance of the brake torque is suppressed to the utmost, and the torque pulsation can be made small.

Besides, the number of current paths is decreased in the region where the appearance of the brake torque is inevitable, by the selective switching element disabling means 53, so that the brake torque can be minimized.

Besides, in a case where the abnormal-state determining means 32 determines any abnormal state, depending upon the magnitudes of detection currents independently of the respective phases, the determination of the abnormal state is apprehended to be erroneously done under the influence of noise or the abnormal state of any other phase when, by way of example, the current is controlled to a large current value near the threshold value of determination.

With the abnormal-state determining means stated in Embodiment 1, however, the abnormal state is determined, not only by estimating the values of the detection currents of the respective phases in terms of the respective absolute values thereof, but also by estimating the values of the detection currents of the three phases relatively, so that the apprehension of the erroneous determination can be relieved.

As described above, according to the control apparatus of Embodiment 1 of this invention, even in the case where the abnormal state has occurred in the wire of the electric motor, the wire of the inverter, or the wire connecting the electric motor and the inverter, and where the overcurrent is apprehended to appear due to the abnormal state, the phase having undergone the abnormal state is disconnected by the abnormal phase disconnecting means 34, and further, using the phases which remain without being disconnected, the current control is continued by the abnormal-state current controlling means 30 replacing the normal-state current controlling means 31, and the respective phases can be individually controlled on the basis of the current commands and voltage commands corresponding to the abnormal state.

Accordingly, the overcurrent is prevented, whereupon the torque output of the electric motor is continued, and the torque pulsation ascribable to the abnormal state is suppressed, so that the operation of the motor can be improved.

Embodiment 2

Figure 9:
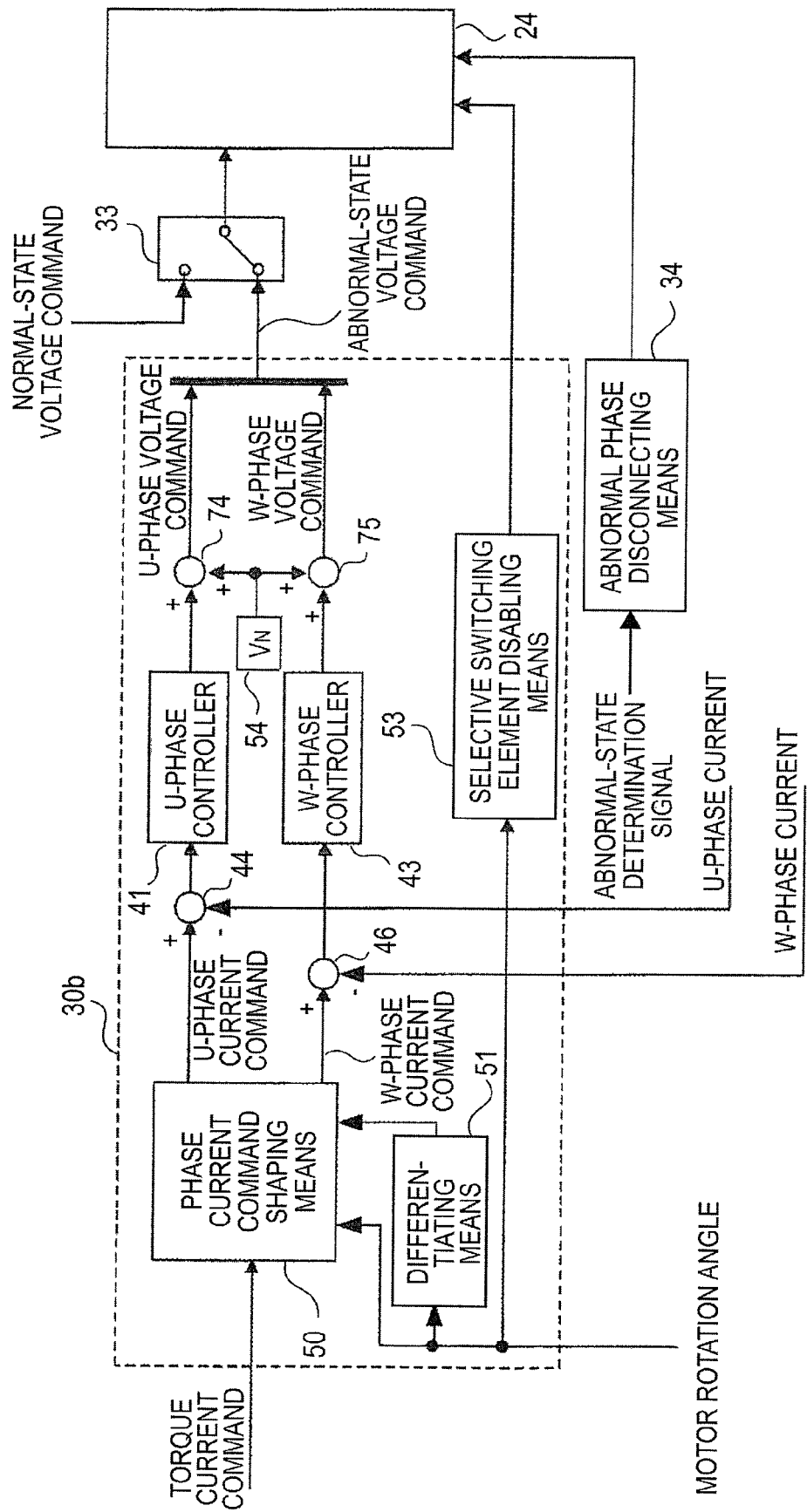
FIG. 9 is a control block-line diagram of an abnormal-state current controlling means in Embodiment 2 of the invention.

FIG. 9 is a control block-line diagram of an abnormal-state current controlling means 30b according to Embodiment 2 of this invention.

In the abnormal-state current controlling means 30a of the grounding-state three-phase individual control of Embodiment 1 as shown in FIG. 3, the phase current command is generated also for the V-phase having undergone the abnormal state, and the control is performed by employing also the V-phase detection current. In contrast, in Embodiment 2, as shown in FIG. 9, the phase current command shaping means 50 generates only U- and W-phase current commands, U- and W-phase detection currents are respectively subtracted from the U- and W-phase current commands by the subtractors 44 and 46, and the resulting current deviations are fed to the U-phase controller 44 and W-phase controller 46, so as to individually control the respective phases.

Also with the configuration of FIG. 9, a control which is substantially equivalent to the grounding-state three-phase individual control of Embodiment 1 is possible, and the same advantages as those of the grounding-state three-phase individual control can be attained in the grounding state of the V-phase.

Embodiment 3

Figure 10:
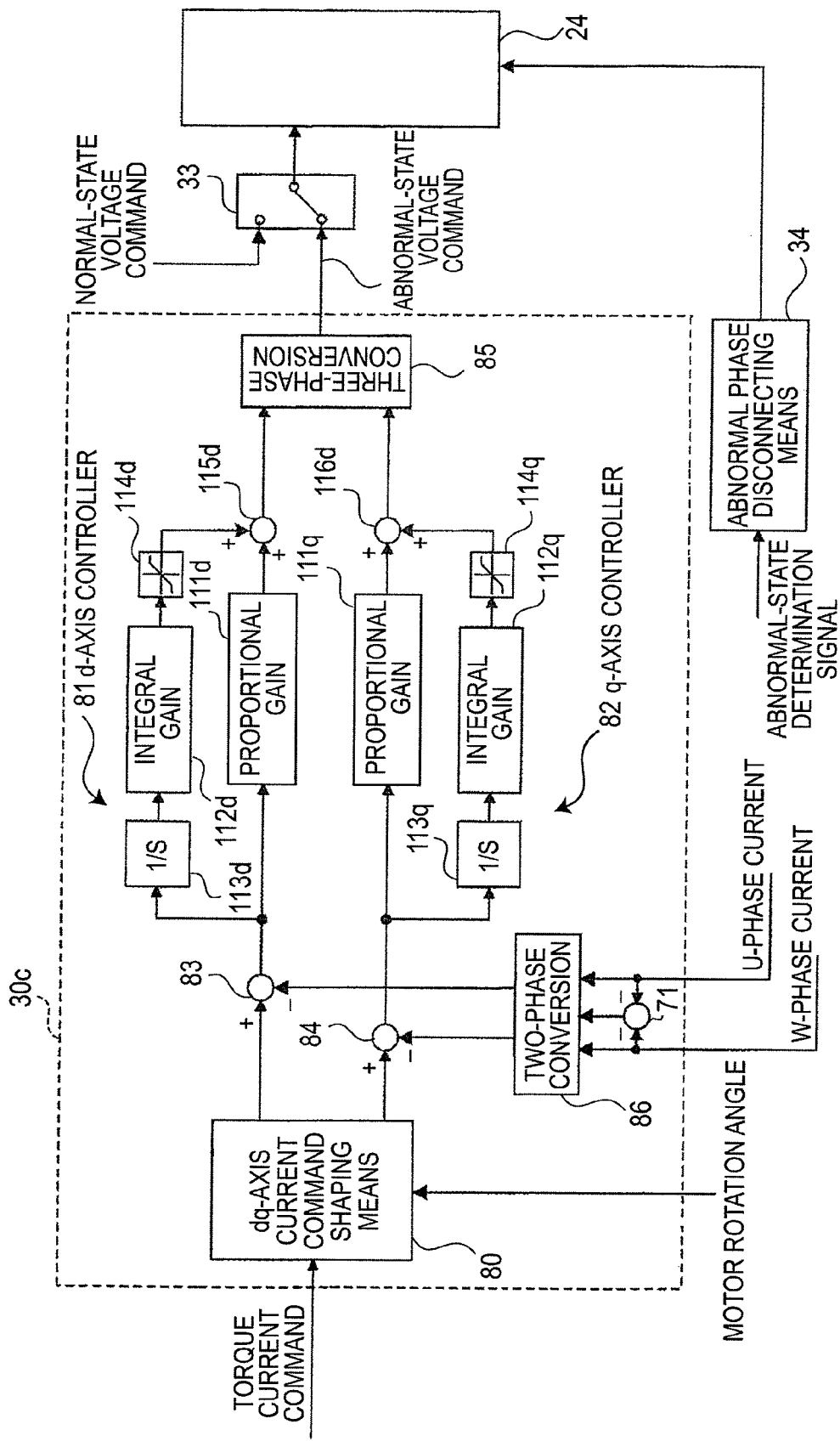
FIG. 10 is a control block-line diagram of an abnormal-state current controlling means in Embodiment 3 of the invention.

FIG. 10 is a control block-line diagram of an abnormal-state current controlling means 30c according to Embodiment 3 of this invention.

In Embodiment 1, the grounding-state three-phase individual control in FIG. 3 has been employed as the abnormal-state current controlling means, but a similar control is possible even when a control system on dq coordinates is employed. One aspect of the control system will now be described as Embodiment 3.

As the abnormal-state current controlling means, the abnormal-state current controlling means 30c shown in FIG. 10 is executed instead of the grounding-state three-phase individual control in FIG. 3 as employed in Embodiment 1.

The control scheme shown in FIG. 10 is substantially similar to the dq control which is employed in the normal state, but it features that the integral terms of d- and q-axis controllers are limited.

Now, FIG. 10 will be described in detail.

A dq-axis current command shaping means 80 generates d- and q-axis current commands in accordance with a torque current command and a motor rotation angle. Subsequently, d-axis and q-axis detection currents outputted from a two-phase conversion means 86 are respectively subtracted from the d-axis and q-axis current commands by subtractors 83 and 84, thereby to calculate d-axis and q-axis current deviations, which are respectively fed to the d-axis controller 81 and the q-axis controller 82. In the respective d- and q-axis current controllers 81 and 82, there are proportional terms which multiply the d- and q-axis current deviations by proportional gains 111d and 111q, and integral terms which multiply the d- and q-axis current deviations integrated by integrators 113d and 113q, by integral gains 112d and 112q. Results calculated here are respectively added, thereby to generate d- and q-axis voltage commands. The integral terms include integral term limitation means 114d and 114q at their output parts, and the values of the integral terms can be limited to values smaller than in the normal state.

Incidentally, although the aspect in which the integral term outputs are limited by the integral term limitation means 114d and 114q is illustrated here, the limitations are similarly attained even when the integral gains 112d and 112q of the integral terms are limited to smaller values. Besides, the integral terms may well be zeroized.

A three-phase conversion means 85 subjects the d- and q-axis voltage commands to three-phase conversion in accordance with the motor rotation angle, thereby to generate U-, V- and W-phase voltage commands.

Besides, although the torque current command has been shaped in accordance with the motor rotation angle by the dq-axis current command shaping means 80, the q-axis current command may well be generated without shaping the torque current command, without employing the dq-axis current command shaping means.

In this manner, the integral terms are limited, and the q-axis current command is shaped by the dq-axis current command shaping means in some cases, whereby the abnormal-state current controlling means can be configured though the dq control is basically employed.

Besides, although the example as shown in FIG. 10 has been illustrated in Embodiment 3, the abnormal-state current controlling means which employs the control system on the dq coordinates can also be in another aspect owing to a modification based on the linearity of a control block.

With the control apparatus in Embodiment 3 of this invention, the integral terms are limited to smaller values than in a normal state, and the d- and q-axis current commands are shaped by the dq-axis current command shaping means 80, whereby the appearance of a brake torque can be suppressed more, and a torque pulsation can be made smaller, than in a case where the dq control in the normal state is continued as it is.

Incidentally, although the abnormal state where one phase grounds has been stated in the above embodiments, a similar control is possible, and similar advantages are attained, by making a slight modification also in an abnormal state where one phase shorts-out to a power supply, that is, an abnormal state where one of a motor wire, an inverter wire and a wire connecting the motor and the inverter short-circuits to a wire leading to the plus potential of the battery, or an abnormal state where the upper switching element of one phase of the inverter short-circuits.

Embodiment 4

Embodiment 1 concerns the case of the occurrence of an abnormal state where one of a motor wire, an inverter wire and a wire connecting the motor and the inverter, in the V-phase, short-circuits to a wire leading to the minus potential of the battery, or an abnormal state where the lower switching element of the V-phase of the inverter short-circuits, that is, the grounding of one phase, and the abnormal-state current controlling means which corresponds to the abnormal state has been described. In Embodiment 4, there will be described a case where an abnormal state in which two phases short-circuit therebetween, in other words, interphase short-circuiting has occurred.

The ensuing description will mention, for example, an abnormal state where one of a motor wire, an inverter wire and a wire connecting the motor and the inverter, in the U-phase, short-circuits to one of the motor wire, the inverter wire and the wire connecting the motor and the inverter, in the V-phase, that is, UV-phase short-circuiting.

In a case where such an abnormal state has occurred, the abnormal-state determining means 32 feeds an abnormal-state determination signal signifying "that the U-phase and the V-phase are abnormal", to the abnormal-state current controlling means 30, the switching means 33 and the abnormal phase disconnecting means 34 in FIG. 2.

In order to prevent an overcurrent from being generated through the U-phase and the V-phase which have undergone the interphase short-circuiting, the abnormal phase disconnecting means 34 sends the switching element driving circuit 24 a command for stopping the drives of the switching elements 61A and 61B of the U-phase. Owing to the switching element driving circuit 24 having received the command, the U-phase switching elements 61A and 61B continue their OFF states, and a drive stop state is established therefor. Either the U-phase or the V-phase may have its drive stopped, and the U-phase is brought into the drive stop state here.

Besides, the abnormal-state current controlling means 30 is actuated by the abnormal-state determination signal, and a three-phase abnormal-state voltage command is fed to the switching element driving circuit 24 through the switching means 33 as a three-phase voltage command. The abnormal-state current controlling means 30 executes a control scheme shown in FIG. 11, in order to perform a current control in which the phases having undergone the abnormal states are considered.

Now, the control operation of the abnormal-state current controlling means 30 will be described in conjunction with FIGS. 11 and 4.

Figure 11:
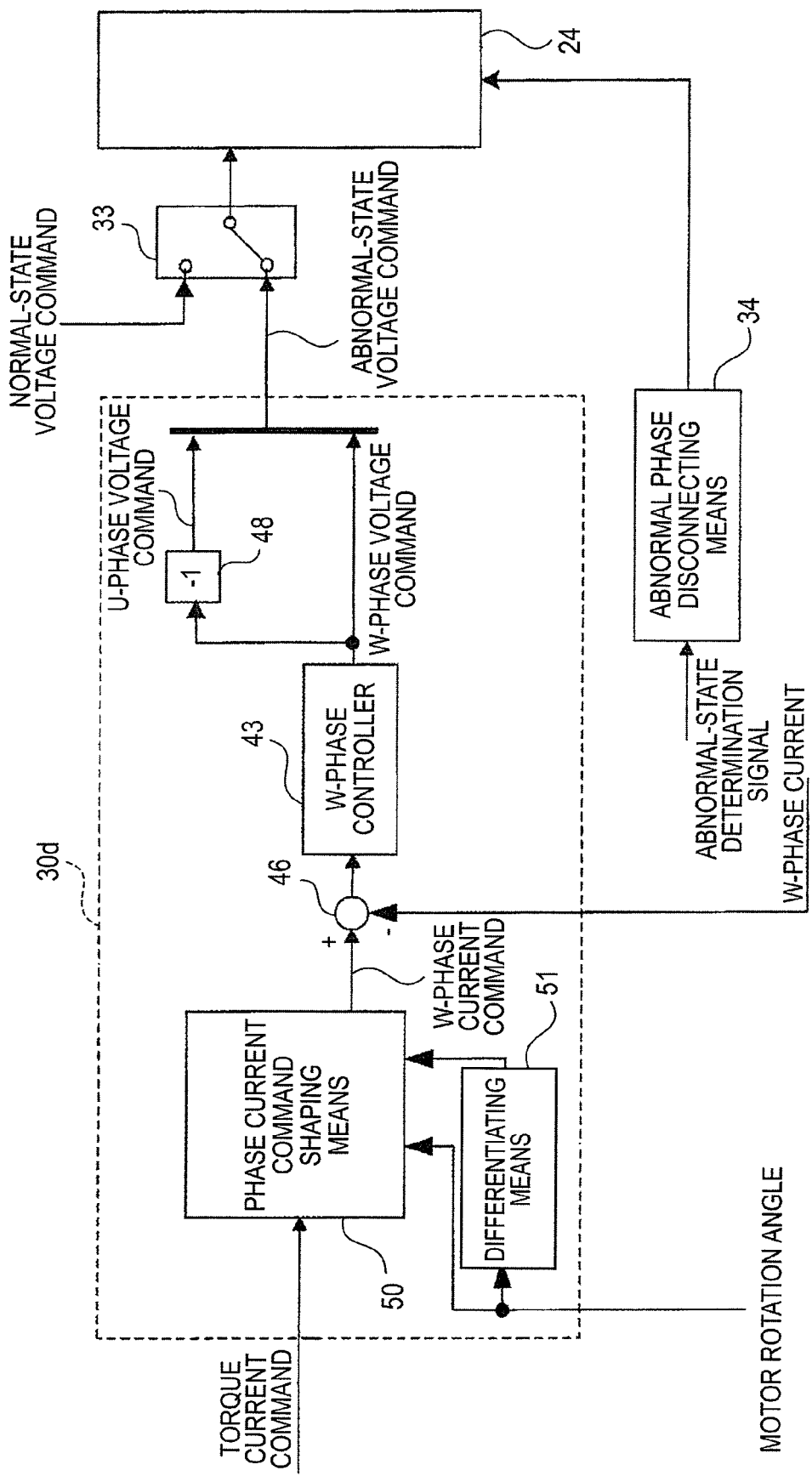
FIG. 11 is a control block-line diagram of an abnormal-state current controlling means in Embodiment 4 of the invention.

FIG. 11 is a control block-line diagram of the abnormal-state current controlling means 30d in the case where the U-phase switching elements have been brought into the drive stop states at the occurrence of the UV-phase short-circuiting, and this control scheme shall be called the "UV-phase short-circuiting-state three-phase individual control" below.

Figure 12A:
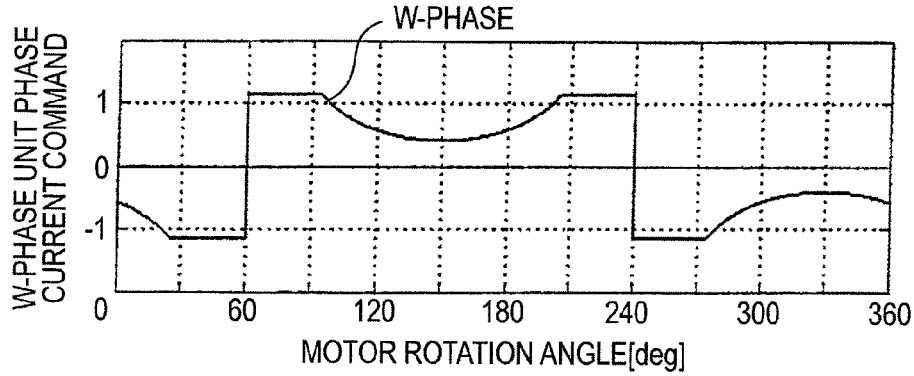
FIG. 12 is a diagram showing examples of a untarget phase current and a motor torque waveform in Embodiment 4 of the invention.

The configuration of a phase current command shaping means 50 in FIG. 11 is similar to that of the means 50 in FIG. 4, but it may be a configuration which outputs only a W-phase current command. The relations of the unit phase current command to a torque current command, a motor rotation angle and a motor rotation angular velocity in a unit phase current command generating means 501 are, for example, relations shown in FIG. 12.

Motor rotation angles at which a motor torque becomes zero or can be generated in only a reverse direction, are existent in the two-phase short-circuiting state. They are 60 degrees and 240 degrees in FIG. 12. In the vicinities of the angles, larger currents than in any other angular region are necessitated for generating torques in a forward direction. In the vicinity of each angle, therefore, the phase current command is enlarged to enlarge a phase voltage command, whereby the larger current is caused to flow.

Figure 12B:
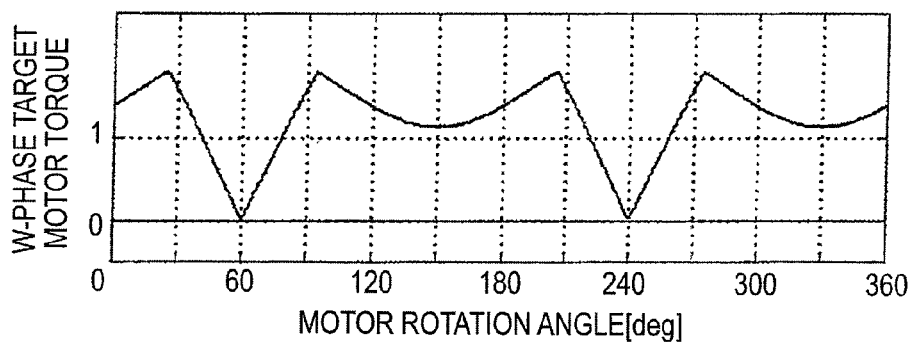

Thus, a torque as shown in FIG. 12(b) can be generated in the normal W-phase.

Besides, in order to suppress a brake torque which enlarges in proportion to the motor rotation angular velocity, the unit phase current command may well be enlarged in proportion to the motor rotation angular velocity.

In this manner, in the case where the interphase short-circuiting has occurred, a current control is continued by an abnormal-state current controlling means replacing a normal-state current controlling means, whereby the respective phases can be individually controlled by the current command and the voltage command which correspond to the abnormal state.

Here, in order to indicate the advantages of Embodiment 4 of this invention, problems in the abnormal state where the phases short-circuit therebetween will be stated below.

In the abnormal state where the phases short-circuit therebetween as stated before, a closed circuit which passes through the motor windings of the two phases having short-circuited with a short-circuiting place is formed, and hence, the motor rotation angle at which the appearance of the brake torque ascribable to the induced power of the motor is inevitable is existent. The brake torque is a torque which acts in the direction of hampering the rotation of the motor.

Even in a case where the motor rotation angular velocity is zero and where the induced power does not act, the motor rotation angle at which the motor torque becomes zero is existent. In the vicinity of the angle, the induced power between the two short-circuiting phases is especially large, and the current needs to be enlarged for the purpose of canceling the brake torque ascribable to the induced power. Since, however, the current which can be caused to flow has an upper limit ordinarily, it is difficult to suppress the appearance of the brake torque.

Figure 13:
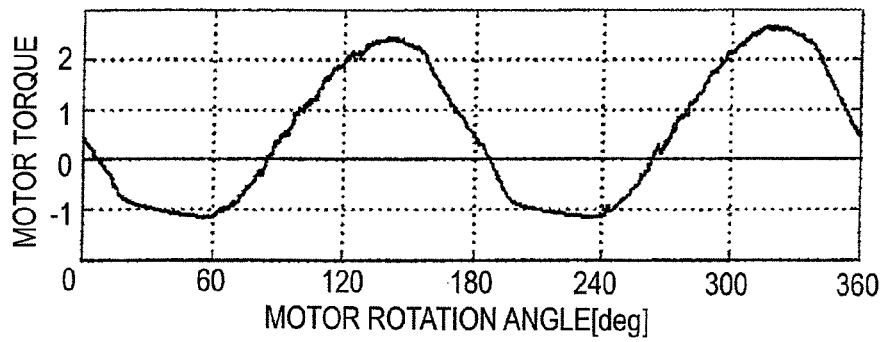
FIG. 13 is a diagram of a motor torque waveform in the abnormal state where two phases short-circuit therebetween in case of employing a control in the prior art.

Besides, when the control is performed by employing the control scheme which is used in the normal state, for example, the dq control, in the abnormal state where the interphase short-circuiting occurs as stated before, it is not suited to the abnormal state. As shown in FIG. 13, therefore, there are the problems that the region of a minus value, namely, the region of the brake torque is large, and that also a torque pulsation becomes large.

Figure 14:
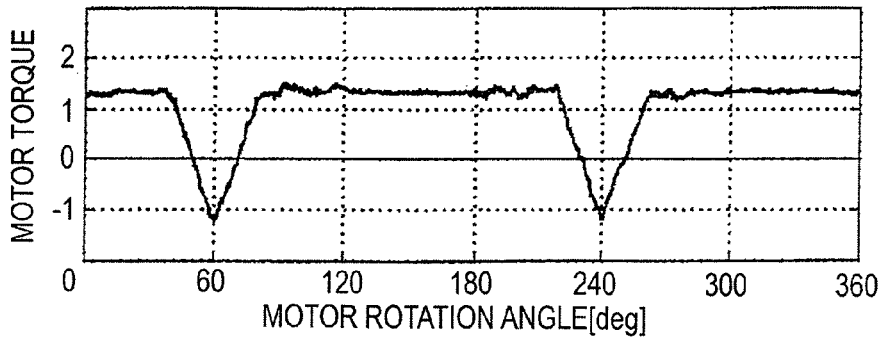
FIG. 14 is a diagram of a motor torque waveform in the abnormal state where two phases short-circuit therebetween in case of employing an electric motor control apparatus according to Embodiment 4 of the invention.

In contrast, when the control apparatus in Embodiment 4 of this invention is used, the current commands of the respective phases suitable for the abnormal state are generated by the phase current command shaping means 50, and the control is configured so as to realize the current commands, and hence, the torque based on the normal phase can be enlarged in the vicinity of the motor rotation angle at which the motor torque becomes zero. As in a motor torque waveform shown in FIG. 14, therefore, the appearance of the brake torque is suppressed to the utmost, and the torque pulsation can be made small.

Besides, in the abnormal state where the interphase short-circuiting occurs, an overcurrent is apprehended to appear through the short-circuiting place and the U-phase and V-phase switching elements. However, according to the control apparatus in Embodiment 4 of this invention, the switching elements of either of the two phases in which the abnormal states have been detected can be brought into the drive stop states by the abnormal phase disconnecting means, so that the overcurrent can be prevented.

Embodiment 5

In Embodiment 5, there will be described a case where an abnormal state in which one phase of a motor winding short-circuits, that is, one-phase short-circuiting has occurred. By way of example, a case where an abnormal state in which the winding of the U-phase short-circuits, that is, U-phase short-circuiting has occurred will be described below.

Figure 15:
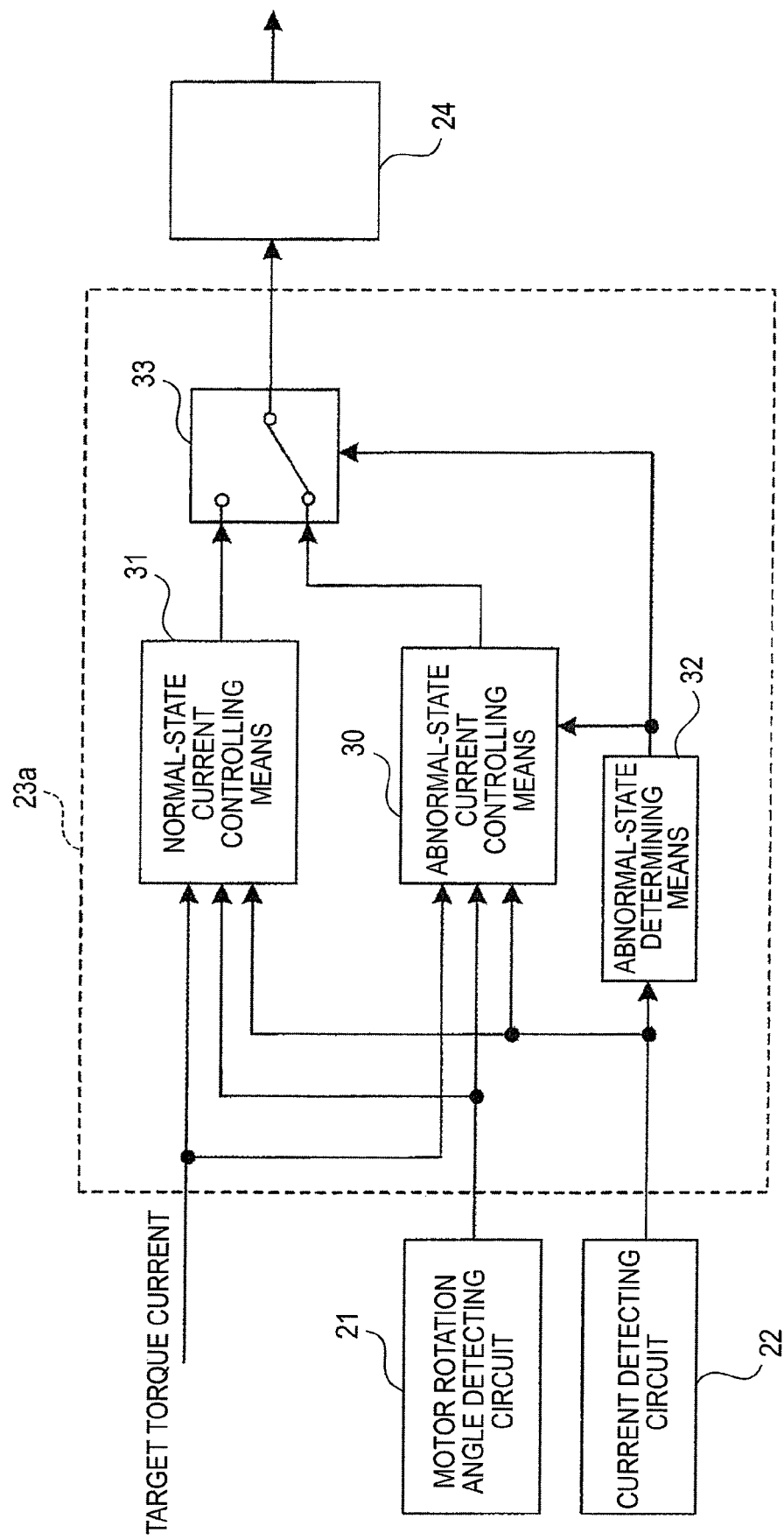
FIG. 15 is a block diagram showing the configuration of a current control means in Embodiment 5 of the invention.

FIG. 15 is a block diagram showing the configuration of a current control means 23a in Embodiment 5 of this invention.

In a case where such an abnormal state has occurred, the abnormal-state determining means 32 feeds an abnormal-state determination signal signifying "that the U-phase is abnormal", to the abnormal-state current controlling means 30 and the switching means 33 in FIG. 15.

The abnormal-state current controlling means 30 is actuated by the abnormal-state determination signal, and a three-phase abnormal-state voltage command is fed to the switching element driving circuit 24 through the switching means 33 as a three-phase voltage command.

The abnormal-state current controlling means 30 executes a control scheme shown in FIG. 16, in order to perform a current control in which the phase having undergone the abnormal state is considered.

Now, the control operation of the abnormal-state current controlling means 30 will be described in conjunction with FIGS. 16 and 4.

FIG. 16 is a control block-line diagram of the abnormal-state current controlling means 30e in the case where the U-phase switching elements have been brought into the drive stop states at the occurrence of the U-phase short-circuiting, and this control scheme shall be called the "U-phase short-circuiting-state three-phase individual control" below.

Referring to FIG. 16, the phase current command shaping means 50 generates V- and W-phase current commands in accordance with a torque current command, a motor rotation angle, and a motor rotation angular velocity. Subtractors 45 and 46 calculate the current deviations of the corresponding phases, respectively, in such a way that V- and W-phase detection currents obtained by the current detection circuit 22 are subtracted from the V- and W-phase current commands, and they feed the resulting current deviations to a V-phase controller 42 and a W-phase controller 43 which are formed of PI controls or the likes. The V- and W-phase controllers 42 and 43 output V- and W-phase voltage commands, respectively. In the state of the U-phase short-circuiting, a current which can be detected by a U-phase current detecting circuit is the total of currents flowing through a short-circuiting place and a U-phase winding, and a current flowing through the U-phase winding cannot be detected, so that a controller need not be disposed for the U-phase current. Regarding a U-phase voltage command, however, the V- and W-phase voltage commands have their signs changed and are then added by a subtractor 76, and the resulting sum is outputted as the U-phase voltage command, in order to control the V- and W-phases at good voltage efficiencies.

In this way, the abnormal-state controlling means 30e shown in FIG. 16 performs the controls individually for the normal phases in accordance with the abnormal state of the U-phase short-circuiting.

The phase current command shaping means 50 has the configuration in Embodiment 1 as shown in FIG. 4 by way of example. In Embodiment 5, however, the U-phase current command is unnecessary.

In the unit phase current command generating means 501, the relations of the unit phase current commands to the torque current command, the motor rotation angle and the motor rotation angular velocity are, for example, relations shown in FIG. 17.

Figure 17A:
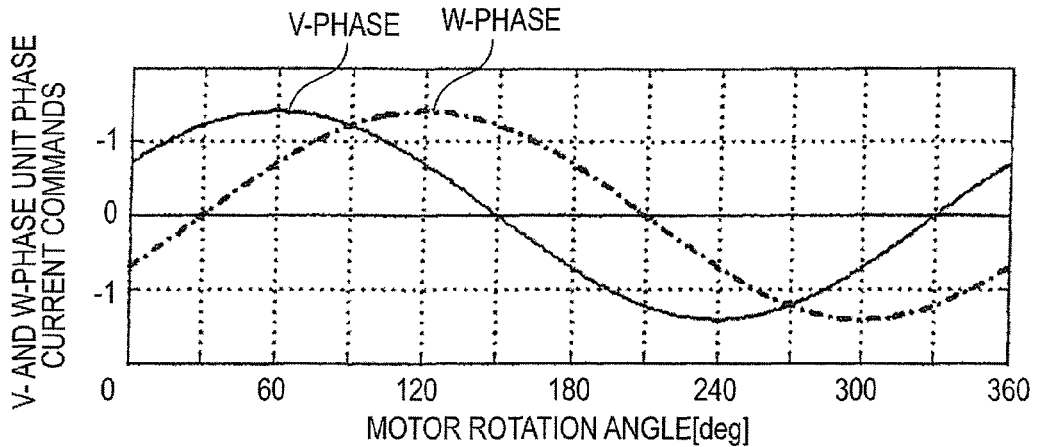
FIG. 17 is a diagram showing examples of untarget phase currents and motor torque waveforms in Embodiment 5 of the invention.
Figure 17B:
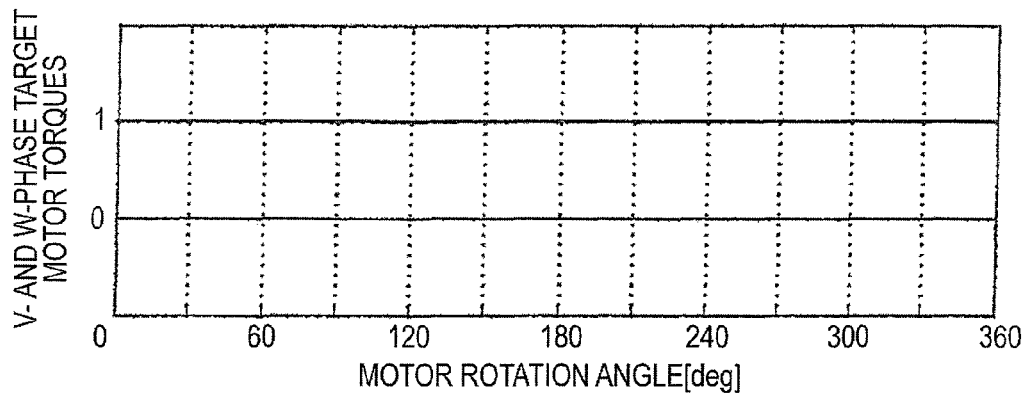

When the V- and W-phase unit phase current commands are generated by employing the relations of FIG. 17(a) and such phase current commands can be realized as the currents of the respective phase windings, a motor torque waveform as shown in FIG. 17(b) can be obtained in the absence of any induced power.

The current commands in FIG. 17(a) assume large values near motor rotation angles of 60 degrees to 120 degrees and near ones of 240 degrees to 300 degrees. The vicinities of the angular regions are regions where the induced powers of the U-phase having short-circuited enlarge, and in order to suppress the influences of brake torque components appearing in the U-phase, the current commands are intended to enlarge the currents of the normal V- and W-phases and to enlarge forward-direction torque components based on the V- and W-phases.

The motor rotation angle on the axis of abscissas is on the scale of the electrical angle of the motor.

Here, in order to indicate the advantages of Embodiment 5 of this invention, problems in the abnormal state where the phase short-circuits will be stated below.

In the abnormal state where one phase short-circuits as stated before, a closed circuit which passes through a short-circuiting place and the winding having short-circuited is formed, and hence, the motor rotation angle at which the appearance of the brake torque ascribable to the induced power of the motor is inevitable is existent. The brake torque is a torque which acts in the direction of hampering the rotation of the motor.

Figure 18:
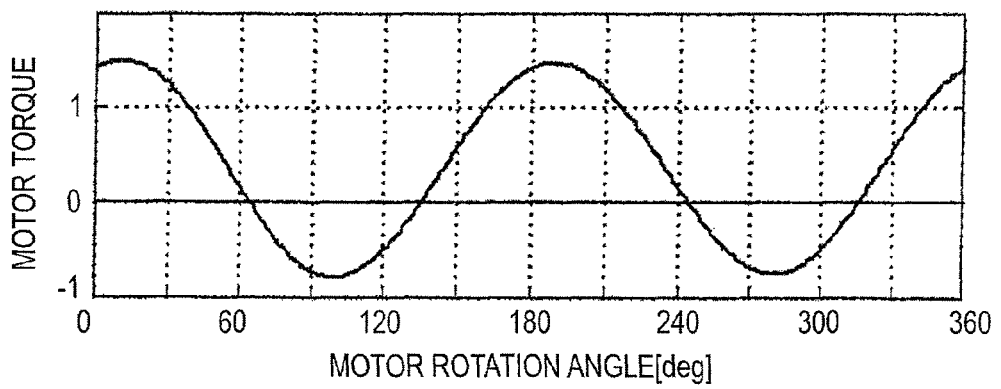
FIG. 18 is a diagram of a motor torque waveform in the abnormal state where one phase short-circuits in case of employing the control in the prior art.

When the control is performed by employing the dq control which is used in the normal state, in the abnormal state where one phase short-circuits as stated before, it is not suited to the abnormal state. As shown in FIG. 18, therefore, there are the problems that the brake torque is large, and that also a torque pulsation becomes large.

Figure 19:
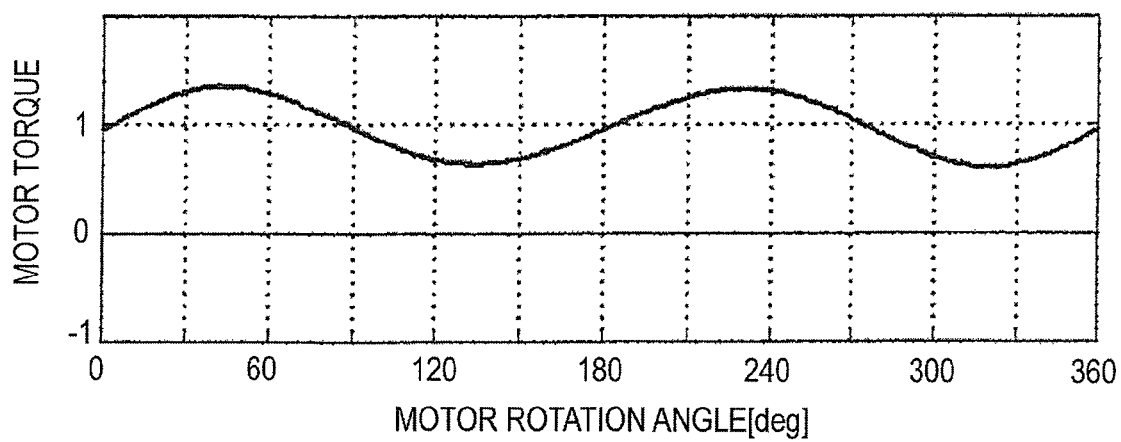
FIG. 19 is a diagram of a motor torque waveform in the abnormal state where one phase short-circuits in case of employing an electric motor control apparatus according to Embodiment 5 of the invention.

In contrast, when the control apparatus in Embodiment 5 of this invention is used, the current commands of the respective phases suitable for the abnormal state are generated by the phase current command shaping means 50, and the control is configured so as to realize the current commands. As in a motor torque waveform shown in FIG. 19, therefore, the appearance of the brake torque is suppressed to the utmost, and the torque pulsation can be made small.

Embodiment 6

Although, in the unit phase current command generating means 501 in Embodiments 1-5, the relation shown in FIG. 5 has been applied to the relation of the unit phase current command to the motor rotation angle, the command value may well be further changed in accordance with the motor rotation angular velocity. By way of example, the unit phase current command in FIG. 5 is increased in proportion to the increase of the motor rotation angular velocity.

In the angular region where the appearance of the brake torque is inevitable, the brake torque enlarges in proportion to the motor rotation angular velocity, and hence, the motor torque is enlarged in the angular region where the torque in the plus direction is possible, by the unit phase current command in this embodiment, whereby a motor output can be ensured on the average. Therefore, the motor output can be made less prone to become insufficient.

Embodiment 7

Regarding the control block-line diagrams of the abnormal-state current controlling means described in the foregoing embodiments, modifications based on the linearities of the constituents are respectively possible, and even when the modifications based on the linearities are made, controls equivalent to those before the modifications can be performed, and hence, equivalent advantages can be obtained.

Figure 20:
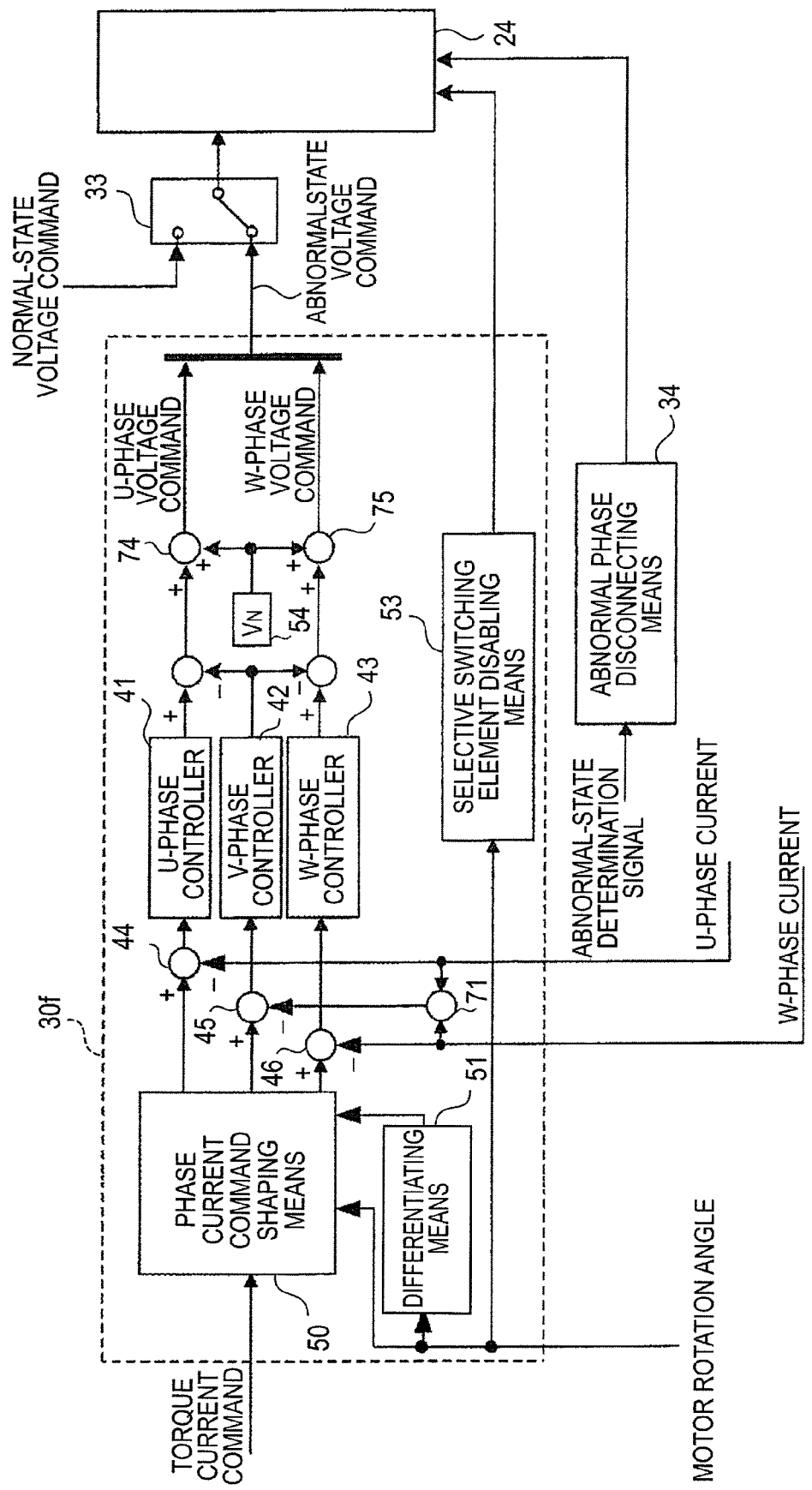
FIG. 20 is a control block-line diagram of the abnormal-state current controlling means in the invention.

FIG. 20 is a control block-line diagram of an abnormal-state current controlling means 30f in Embodiment 7 of this invention, in which the abnormal-state current controlling means 30a shown in FIG. 3 has been modified on the basis of such a linearity.

In FIG. 20, the same reference numerals as in FIG. 3 indicate identical or equivalent parts.

FIG. 20 has been modified so as to become equivalent to FIG. 3, owing to the property of linear elements that, in a case where the U-phase controller 41 and the V-phase controller 42 in FIG. 3 are linear and the same, additions/subtractions at the inputs of the elements are respectively equivalent to additions/subtractions at the outputs thereof after the computations.

Incidentally, although the case of the three-phase motor has been chiefly stated in the above embodiments 1-7, it is needless to say that the invention is similarly applicable to a motor of four or more phases and that similar advantages are obtained, by designating target phase currents individually for the respective phases and disposing controllers individually.

Embodiment 8

Figure 21:
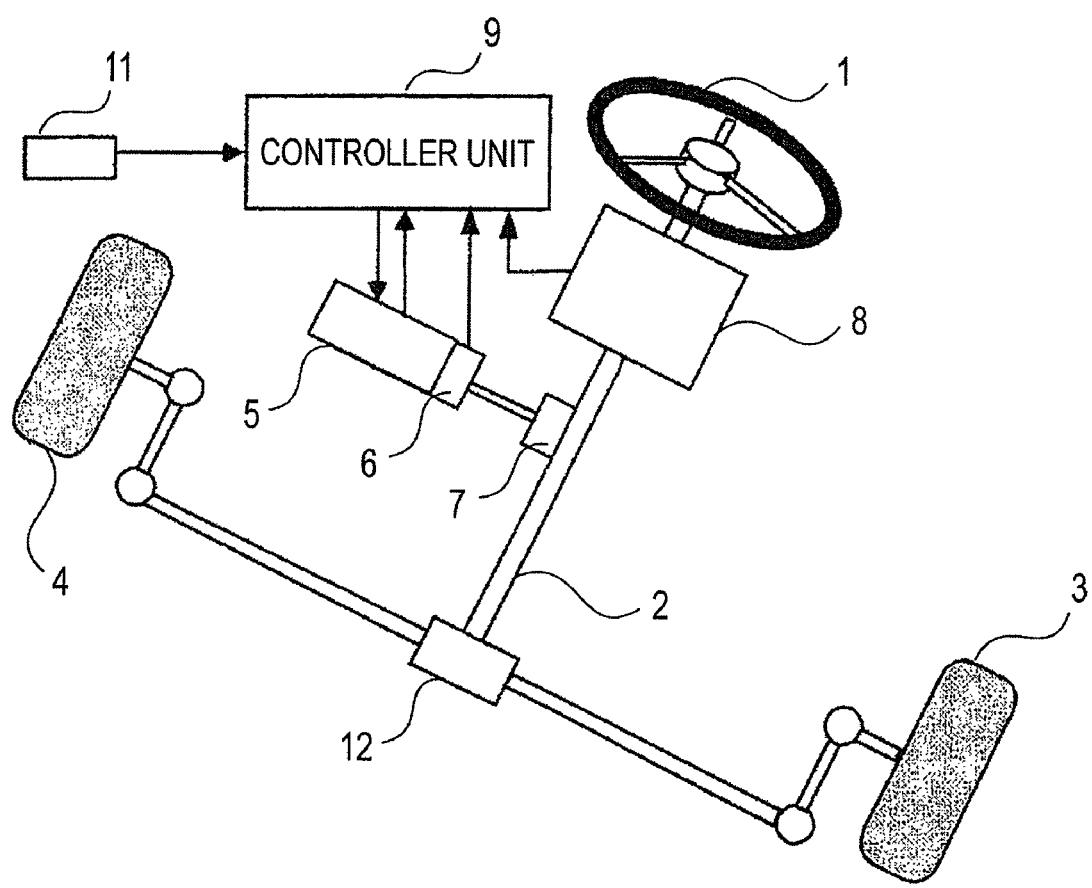
FIG. 21 is a schematic configurational diagram of an electrically-driven power steering apparatus according to Embodiment 8 of the invention.
Figure 22:
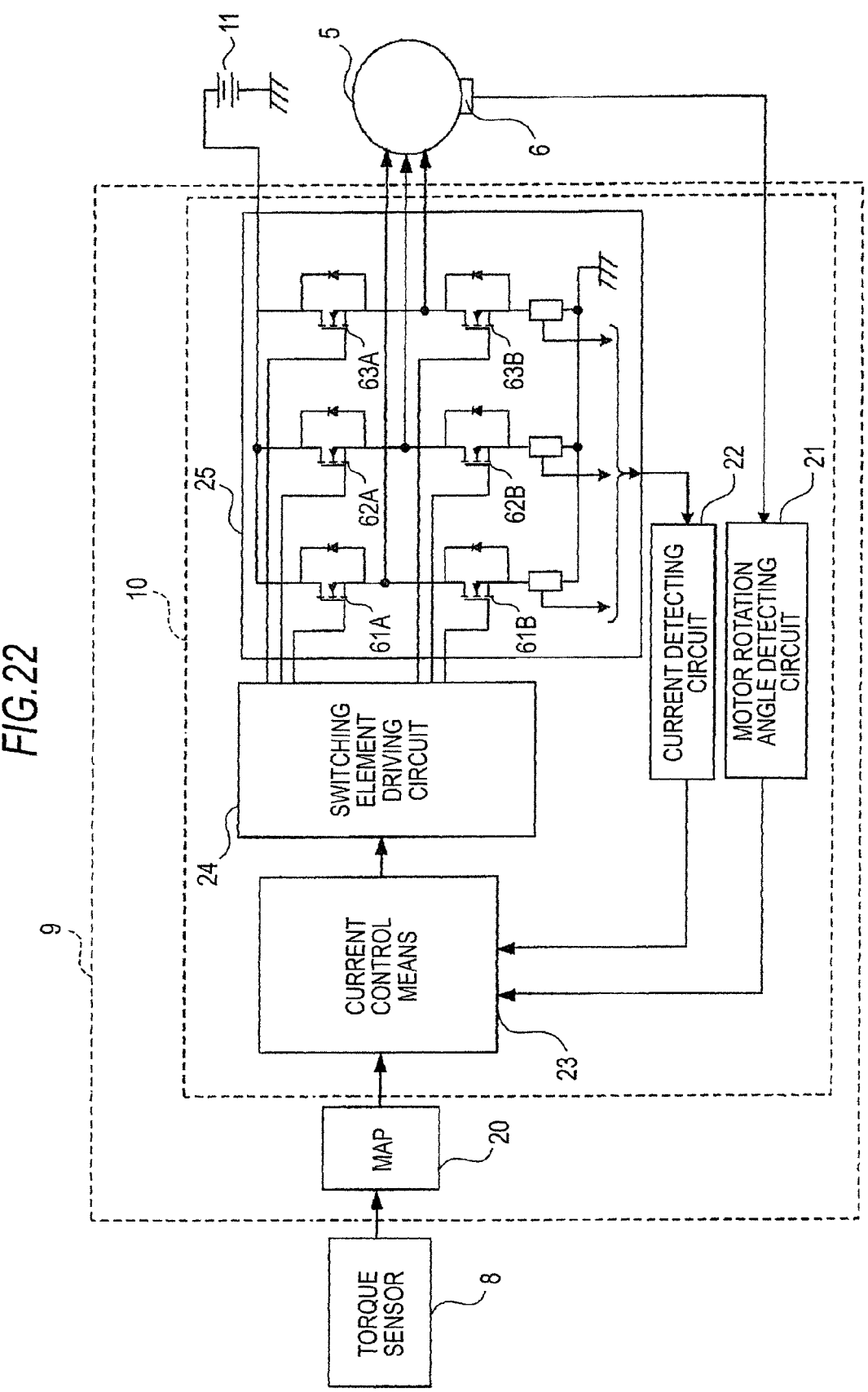
FIG. 22 is a block diagram showing the configuration of a controller unit in Embodiment 8 of the invention.

FIGS. 21 and 22 show Embodiment 8 of this invention, and they show an example in which the electric motor control apparatus of this invention as illustrated in any of the foregoing embodiments is applied to an electrically-driven power steering apparatus. Incidentally, there will be exemplified a case where the electrically-driven power steering apparatus includes a three-phase brushless motor, but this invention can be used also for any other apparatus whose power is generated by an electric motor that is driven to rotate by a multiphase alternating current.

FIG. 21 is a schematic configurational diagram of the electrically-driven power steering apparatus according to Embodiment 8 of this invention. Referring to FIG. 21, a steering force exerted on a steering wheel 1 by a driver not shown is passed through a steering shaft 2 and is transmitted to a rack through a rack-and-pinion gear 12, thereby to steer wheels 3 and 4. The brushless motor 5 (hereinbelow, also termed the "motor") including the windings of the three-phases of U-, V- and W-phases is connected with the steering shaft 2 through a motor reduction gear 7. A motor torque (hereinbelow, also termed the "assisting force") generated by the motor is transmitted to the steering shaft 2 through the motor reduction gear 7, and it relieves the steering force which the driver exerts in a steering operation.

A torque sensor 8 detects the steering force exerted on the steering shaft 2 in such a way that the driver steers the steering wheel 1. A controller unit 9 determines the direction and magnitude of the assisting force which the motor 5 is to bestow, in accordance with the steering force detected by the torque sensor 8, and it controls currents which are to flow from a power source 11 to the motor, in order to generate the assisting force. Incidentally, numeral 6 designates a motor angle sensor which detects the rotation angle of the motor.

FIG. 22 is a block diagram showing the configuration of the controller unit 9.

Referring to FIG. 22, the controller unit 9 is configured of a map 20 which calculates a torque current command corresponding to the target value of a motor torque, and an electric motor control apparatus 10.

The map 20 in which motor torques to be outputted are stored beforehand, determines the direction and magnitude of the motor torque corresponding to the steering force detected by the torque sensor 8 and calculates the torque current command. In order to realize the torque current command, the electric motor control apparatus 10 controls the currents flowing through the respective phases of the motor. The assisting force based on the motor 5 is generated by the currents.

The electric motor control apparatus 10 is, for example, one shown in any of Embodiments 1-3.

Here will be described problems in the abnormal state where one phase in the electrically-driven power steering apparatus grounds.

As stated also in Embodiment 1, in the abnormal state where one phase grounds, a closed circuit passing through a grounding place is formed, and hence, a motor rotation angle at which the appearance of a brake torque ascribable to the induced power of the motor is inevitable is existent. The brake torque is a torque which acts in the direction of hampering the rotation of the motor. Besides, when a control is executed by employing a dq control which is used in a normal state, in the abnormal state of the grounding of one phase, it is not suited to the abnormal state. Therefore, there are the problems that the brake torque is large, and that a torque pulsation becomes large in plus and minus directions.

In case of an electrically-driven power steering apparatus, accordingly, a sense of incompatibility which the driver feels is intense.

On the other hand, according to the electrically-driven power steering apparatus configured as stated above, in the case of the abnormal state where one phase grounds, the appearance of the brake torque is suppressed to the utmost, and the torque pulsation can be made small. Besides, in a region where the appearance of the brake torque is inevitable, the brake torque can be minimized by a selective switching element disabling means. Therefore, the sense of incompatibility which the driver feels can be relieved.

Incidentally, the electric motor control apparatus stated above has been one illustrated in any of Embodiments 1-3, but the electric motor control apparatus illustrated in Embodiment 4 may well be employed. A case where the abnormal state of the interphase short-circuiting between two phases has occurred, will be stated below.

Besides, there will be described problems in the abnormal state where the two phases in the electrically-driven power steering apparatus undergo the interphase short-circuiting.

In the abnormal state of the interphase short-circuiting, a closed circuit is formed through a short-circuiting place and the motor windings of the two phases having short-circuited, and hence, a motor rotation angle at which the appearance of a brake torque ascribable to the induced power of the motor is inevitable is existent. The brake torque is a torque which acts in the direction of hampering the rotation of the motor. Even in a case where the rotation angular velocity of the motor is zero and where the induced power does not act, a motor rotation angle at which a motor torque becomes zero is existent. In the vicinity of the angle, the induced power between the two short-circuiting phases is especially large, and a current needs to be enlarged for the purpose of canceling the brake torque ascribable to the induced power. Since, however, the current which can be caused to flow has an upper limit ordinarily, it is difficult to suppress the appearance of the brake torque.

Besides, when the control is performed by employing the dq control which is used in the normal state, in the abnormal state of the interphase short-circuiting, it is not suited to the abnormal state. Therefore, there are the problems that the brake torque is large, and that a torque pulsation becomes large in plus and minus directions.

In case of an electrically-driven power steering apparatus, accordingly, a sense of incompatibility which the driver feels is intense.

On the other hand, with the electrically-driven power steering apparatus configured of the electric motor control apparatus illustrated in Embodiment 4 as stated above, in the case of the abnormal state where the two phases undergo the interphase short-circuiting, the appearance of the brake torque is suppressed to the utmost, and the torque pulsation can be made small. Therefore, the sense of incompatibility which the driver feels can be relieved.

Besides, the electric motor control apparatus illustrated in Embodiment 5 may well be employed instead of employing the electric motor control apparatus illustrated in any of Embodiments 1-4. A case where the abnormal state of one-phase short-circuiting has occurred, will be stated below.

There will be described problems in the abnormal state where one phase in the electrically-driven power steering apparatus undergoes the short-circuiting.

In the abnormal state of the one-phase short-circuiting, a closed circuit is formed through a short-circuiting place and a winding having short-circuited, and hence, a motor rotation angle at which the appearance of a brake torque ascribable to the induced power of the motor is inevitable is existent.

The brake torque is a torque which acts in the direction of hampering the rotation of the motor.

When the control is performed by employing the dq control which is used in the normal state, in the abnormal state of the one-phase short-circuiting, it is not suited to the abnormal state. Therefore, there are the problems that the brake torque is large, and that a torque pulsation becomes large in plus and minus directions.

In case of an electrically-driven power steering apparatus, accordingly, a sense of incompatibility which the driver feels is intense.

On the other hand, with the electrically-driven power steering apparatus configured of the electric motor control apparatus illustrated in Embodiment 5 as stated above, in the case where the abnormal state of the one-phase short-circuiting has occurred, the appearance of the brake torque is suppressed to the utmost, and the torque pulsation can be made small. Therefore, the sense of incompatibility which the driver feels can be relieved.

Besides, when the electric motor control apparatus illustrated in Embodiment 6 is employed, a motor output can be ensured on the average by enlarging a motor torque in an angular region in which the torque in the plus direction is possible, so that a sense of incompatibility which the driver feels can be relieved.

The invention claimed is:

1. An electric motor control apparatus for a multiphase AC electric motor comprising:
   a current detecting circuit which detects currents flowing through respective phases of the electric motor;
   current control means for determining a multiphase voltage command in accordance with a torque current command corresponding to a target value of a torque to be generated by the electric motor and detected currents flowing through the respective phases and detected by the current detecting circuit, the current control means including
      normal-state current controlling means for controlling current in a normal state,
      abnormal-state current controlling means for controlling current in an abnormal state,
      abnormal-state determining means for detecting as an abnormal phase an abnormal state of any of a wire of the electric motor, a wire of an inverter, and a wire connecting the electric motor to the inverter, and
      abnormal phase disconnecting means, wherein
         the abnormal phase disconnecting means disconnects at least one abnormal phase detected by the abnormal-state determining means from the circuit, and
         the abnormal-state current controlling means generates an abnormal-state voltage command corresponding to the abnormal phase detected by the abnormal-state determining means and uses phases, other than a disconnected phase, of the inverter to control currents of the phases, with the abnormal-state voltage command used as the multiphase voltage command; and
   a switching element driving circuit which commands the inverter which includes switching elements, through switching manipulation signals, based on the multiphase voltage command from the current control means, to control the switching elements of the inverter, thereby controlling currents fed to the respective phases of the electric motor.

2. The electric motor control apparatus as defined in claim 1, wherein
   the abnormal-state determining means detects the abnormal state by estimating relative values of the detected currents of three or more phases, and
   the abnormal-state determining means detects any phase as being in the abnormal state when a time period for which (i) magnitude of the detection current of the phase remains above a predetermined value for longer than a predetermined time period and for which (ii) the detected currents of other phases remain at or below a predetermined value for longer than the predetermined time period.

3. The electric motor control apparatus as defined in claim 1 wherein the abnormal-state current controlling means further includes
   phase current command shaping means for generating phase current commands of the respective phases in accordance with the torque current command, and
   phase current controlling means for receiving deviations between the phase current commands from the phase current command shaping means and the detection currents detected by the detecting circuit, and for generating the abnormal-state voltage command based on the current deviations, wherein the phase current controlling means is disposed individually in at least one phase.

4. The electric motor control apparatus as defined in claim 3, wherein the phase current controlling means receives deviations between phase current commands from the phase current command shaping means and the detection currents detected by the detecting circuit, and generates the abnormal-state voltage command in accordance with values obtained by additions to and/or subtractions from the current deviations of the normal phases and the current deviations of the abnormal phases.

5. The electric motor control apparatus as defined in claim 3, wherein the abnormal-state current controlling means corrects the abnormal-state voltage command or abnormal-state current command using at least one of rotation angular velocity and rotation angle.

6. The electric motor control apparatus as defined in claim 1, wherein the abnormal phase disconnecting means stops operation of the switching elements in a disabled state, in at least one of the abnormal phases, thereby disconnecting at least one of the abnormal phases from the circuit.

7. The electric motor control apparatus as defined in claim 1, wherein the electric motor control apparatus further comprises
rotation angle detecting means for calculating rotation angle of the electric motor, and
selective switching element disabling means for generating a command indicating a disabled state and supplied to the switching elements of at least one phase, temporarily, when the rotation angle is within an angular range in which a current is to become zero.

8. The electric motor control apparatus as defined in claim 1, wherein the abnormal-state current controlling means includes
dq-axis current command shaping means for generating a d-axis current command and a q-axis current command in accordance with the torque current command and motor rotation angle, and
a d-axis controller and a q-axis controller to which current deviations between the d- and q-axis current commands and d- and q-axis detection currents output from a two-phase conversion means are input and which generate d- and q-axis voltage commands based on current deviations, wherein the d-axis controller and the q-axis controller include integral term limiting means for limiting values of integral terms, for integral term outputs into which outputs of integrators for integrating the current deviations are multiplied by integral gains.

9. The electric motor control apparatus as defined in claim 1, wherein, in the abnormal state, one wire of the electric motor, one wire of the inverter, or the wire connecting the electric motor to the inverter, short-circuits to a wire which leads to a minus potential or a plus potential of a battery feeding electric power to the inverter, and, in response, the abnormal-state current controlling means generates the abnormal-state voltage command corresponding to the abnormal state.

10. The electric motor control apparatus as defined in claim 1, wherein, in the abnormal state, an upper switching element or a lower switching element disposed in each of the phases of the inverter short-circuits, and, in response, the abnormal-state controlling means generates the abnormal-state voltage command corresponding to the abnormal state.

11. The electric motor control apparatus as defined in claim 1, wherein, in the abnormal state, two locations of the wire of the electric motor, two locations of the wire of the inverter, or two locations of the wire connecting the electric motor to the inverter short-circuit, and, in response, the abnormal-state controlling means generates the abnormal-state voltage command corresponding to the abnormal state.

12. The electric motor control apparatus as defined in claim 1, wherein, in the abnormal state, at least two phases short-circuit, at least one of the abnormal phases is disconnected by the abnormal phase disconnecting means, the individual phase current controlling means controls individual currents in the remaining phases of the inverter, and the abnormal-state voltage command or abnormal-state current command is enlarged proximate a motor rotation angle at which output torque of the electric motor becomes zero or can be generated only in a reverse direction.

13. An electric motor control apparatus for a multiphase AC electric motor comprising:
a current detecting circuit which detects currents flowing through respective phases of the electric motor;
current control means for determining a multiphase voltage command in accordance with a torque current command corresponding to a target value of a torque to be generated by the electric motor and detected currents flowing through the respective phases and detected by the current detecting circuit, the current control means including
normal-state current controlling means for controlling current in a normal state,
abnormal-state current controlling means for controlling current in an abnormal state,
abnormal-state determining means for detecting as an abnormal phase an abnormal state of any of a wire of the electric motor, a wire of an inverter, and a wire connecting the electric motor to the inverter, wherein the abnormal-state current controlling means generates an abnormal-state voltage command corresponding to the abnormal state detected by the abnormal-state determining means and uses both the abnormal phase and a normal phase of the inverter to control currents of the phases, with the abnormal-state voltage command used as the multiphase voltage command; and
a switching element driving circuit which commands the inverter including switching elements, through switching manipulation signals based on the multiphase voltage command from the current control means to control the switching elements of the inverter, thereby controlling currents fed to the respective phases of the electric motor.

14. The electric motor control apparatus as defined in claim 13, wherein, in the abnormal state, a winding of one phase of the electric motor short-circuits, the individual phase current controlling means controls individual currents without disconnection of the abnormal phases by the abnormal phase disconnecting means, and the abnormal-state voltage command or abnormal-state current command is enlarged proximate a motor rotation angle at which an induced voltage of the phase that is short circuited is enlarged.

15. The electric motor control apparatus as defined in claim 13, wherein
the abnormal-state determining means detects the abnormal state by estimating relative values of the detected currents of three or more phases, and
the abnormal-state determining means detects any phase as being in the abnormal state when a time period for which (i) magnitude of the detection current of the phase remains above a predetermined value for longer than a predetermined time period and for which (ii) the detected currents of other phases remain at or below a predetermined value for longer than the predetermined time period.

16. The electric motor control apparatus as defined in claim 13, wherein the abnormal-state current controlling means further includes
phase current command shaping means for generating phase current commands of the respective phases in accordance with the torque current command, and
phase current controlling means for receiving deviations between the phase current commands from the phase current command shaping means and the detection currents detected by the detecting circuit, and for generating the abnormal-state voltage command based on the current deviations, wherein the phase current controlling means is disposed individually in at least one phase.

17. The electric motor control apparatus as defined in claim 16, wherein the phase current controlling means receives deviations between phase current commands from the phase current command shaping means and the detection currents detected by the detecting circuit, and generates the abnormal-state voltage command in accordance with values obtained by additions to and/or subtractions from the current deviations of the normal phases and the current deviations of the abnormal phases.

18. The electric motor control apparatus as defined in claim 16, wherein the abnormal-state current controlling means corrects the abnormal-state voltage command or abnormal-state current command using at least one of rotation angular velocity and rotation angle.

19. The electric motor control apparatus as defined in claim 13, wherein the abnormal-state current controlling means includes
dq-axis current command shaping means for generating a d-axis current command and a q-axis current command in accordance with the torque current command and motor rotation angle, and
a d-axis controller and a q-axis controller to which current deviations between the d- and q-axis current commands and d- and q-axis detection currents output from a two-phase conversion means are input and which generate d- and q-axis voltage commands based on the current deviations and the d-axis controller and the q-axis controller include integral term limiting means for limiting values of integral terms, for integral term outputs into which outputs of integrators for integrating the current deviations are multiplied by integral gains.

20. The electric motor control apparatus as defined in claim 13, wherein, in the abnormal state, two locations of the wire of the electric motor, two locations of the wire of the inverter, or two locations of the wire connecting the electric motor to the inverter short-circuit, and, in response, the abnormal-state controlling means generates the abnormal-state voltage command corresponding to the abnormal state.

* * * * *